US012184558B1

(12) United States Patent
Pukhtaievych et al.

(10) Patent No.: US 12,184,558 B1
(45) Date of Patent: Dec. 31, 2024

(54) BANDWIDTH ESTIMATION ADAPTION FOR NETWORK STALLS

(71) Applicant: Amazon Technologies, Inc., Seattle, WA (US)

(72) Inventors: Roman Pukhtaievych, Kyiv (UA); Andrey Malivanchuk, Kyiv (UA); Oleksandr Beregovyi, Kyiv (UA); Jerry Jongerius, Kissimmee, FL (US)

(73) Assignee: Amazon Technologies, Inc., Seattle, WA (US)

( * ) Notice: Subject to any disclaimer, the term of this patent is extended or adjusted under 35 U.S.C. 154(b) by 76 days.

(21) Appl. No.: 18/082,827

(22) Filed: Dec. 16, 2022

(51) Int. Cl.
*H04L 47/30* (2022.01)
*H04L 43/062* (2022.01)
*H04L 43/106* (2022.01)
*H04L 47/70* (2022.01)

(52) U.S. Cl.
CPC ............ *H04L 47/30* (2013.01); *H04L 43/062* (2013.01); *H04L 43/106* (2013.01); *H04L 47/70* (2013.01)

(58) Field of Classification Search
None
See application file for complete search history.

(56) References Cited

U.S. PATENT DOCUMENTS

| 4,764,953 | A  | 8/1988  | Chern et al. |
| 5,428,388 | A  | 6/1995  | von Bauer et al. |
| 5,760,848 | A  | 6/1998  | Cho |
| 6,072,402 | A  | 6/2000  | Kniffin et al. |
| 6,192,257 | B1 | 2/2001  | Ray |
| 6,271,752 | B1 | 8/2001  | Vaios |
| 6,429,893 | B1 | 8/2002  | Xin |
| 6,456,322 | B1 | 9/2002  | Marinacci |
| 6,476,858 | B1 | 11/2002 | Ramirez Diaz et al. |
| 6,633,231 | B1 | 10/2003 | Okamoto et al. |
| 6,658,091 | B1 | 12/2003 | Naidoo et al. |
| 6,753,774 | B2 | 6/2004  | Pan et al. |
| 6,970,183 | B1 | 11/2005 | Monroe |
| 7,062,291 | B2 | 6/2006  | Ryley et al. |
| 7,065,196 | B2 | 6/2006  | Lee |

(Continued)

FOREIGN PATENT DOCUMENTS

| CN | 2585521 | 11/2003 |
| CN | 2792061 | 6/2006 |

(Continued)

*Primary Examiner* — Fadi Haj Said
(74) *Attorney, Agent, or Firm* — Lee & Hayes, P.C.

(57) ABSTRACT

This disclosure describes, in part, techniques for adapting bandwidth estimation algorithms to account for local network stalls (e.g., Wi-Fi stalls). For instance, an electronic device may use a pacer component and/or a network socket buffer to detect Wi-Fi stalls. The pacer component and/or the network socket buffer may both be configured to store packets. The pacer component may determine a number of bytes to send to the network socket buffer based on a current bandwidth (or bitrate) estimation value and may move packets from the pacer component to the network socket buffer. If the second queue reaches capacity at a first time and is no longer at capacity at a second subsequent time, a Wi-Fi stall may be detected, and the electronic device may transition from a first state to a second state causing the electronic device to determine whether to update a current bandwidth estimation value.

20 Claims, 8 Drawing Sheets

(56) References Cited

U.S. PATENT DOCUMENTS

| | | |
|---|---|---|
| 7,085,361 B2 | 8/2006 | Thomas |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 11,258,716 B1* | 2/2022 | Coglitore ............ H04L 47/2425 |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2007/0008081 A1 | 1/2007 | Tylicki et al. |
| 2010/0225455 A1 | 9/2010 | Claiborne et al. |
| 2013/0057695 A1 | 3/2013 | Huisking |
| 2014/0267716 A1 | 9/2014 | Child et al. |
| 2015/0035987 A1 | 2/2015 | Fernandez |
| 2015/0146778 A1* | 5/2015 | De Cicco ............ H04N 19/115 |
| | | 375/240.07 |
| 2015/0163463 A1 | 6/2015 | Hwang et al. |
| 2016/0037128 A1* | 2/2016 | Van der Auwera .......................... |
| | | H04N 21/2662 |
| | | 348/14.13 |
| 2018/0176512 A1 | 6/2018 | Siminoff |
| 2021/0203578 A1* | 7/2021 | Li ............ H04L 43/04 |
| 2023/0090431 A1* | 3/2023 | Banin ............ H04B 1/04 |
| | | 375/295 |

FOREIGN PATENT DOCUMENTS

| | | |
|---|---|---|
| EP | 0944883 | 9/1999 |
| EP | 1480462 | 11/2004 |
| GB | 2286283 | 8/1995 |
| GB | 2354394 | 3/2001 |
| GB | 2357387 | 6/2001 |
| GB | 2400958 | 10/2004 |
| JP | 2001103463 | 4/2001 |
| JP | 2002033839 | 1/2002 |
| JP | 2002125059 | 4/2002 |
| JP | 2002342863 | 11/2002 |
| JP | 2002344640 | 11/2002 |
| JP | 2002354137 | 12/2002 |
| JP | 2002368890 | 12/2002 |
| JP | 2003283696 | 10/2003 |
| JP | 2004128835 | 4/2004 |
| JP | 2005341040 | 12/2005 |
| JP | 2006147650 | 6/2006 |
| JP | 2006262342 | 9/2006 |
| JP | 2009008925 | 1/2009 |
| WO | WO9839894 | 9/1998 |
| WO | WO0113638 | 2/2001 |
| WO | WO0193220 | 12/2001 |
| WO | WO02085019 | 10/2002 |
| WO | WO03028375 | 4/2003 |
| WO | WO03096696 | 11/2003 |
| WO | WO2006038760 | 4/2006 |
| WO | WO2006067782 | 6/2006 |
| WO | WO2007125143 | 11/2007 |

* cited by examiner

BANDWIDTH ESTIMATION ADAPTION FOR NETWORK STALLS

BACKGROUND

Home security is a concern for many homeowners and renters. Those seeking to protect or monitor their homes often wish to have video and audio communications with visitors, for example, those visiting an external door or entryway. Electronic devices configured as audio/video (A/V) recording and communication devices, such as video doorbell devices, provide this functionality, and can also aid in crime detection and prevention. For example, audio and/or video recorded by an A/V recording and communication device can be uploaded to the cloud and recorded on a remote server. Subsequent review of the A/V footage can aid law enforcement in recording perpetrators of home burglaries and other crimes. Further, the presence of one or more A/V recording and communication devices on the exterior of a home, such as a doorbell unit at the entrance to the home, acts as a powerful deterrent against would-be burglars.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
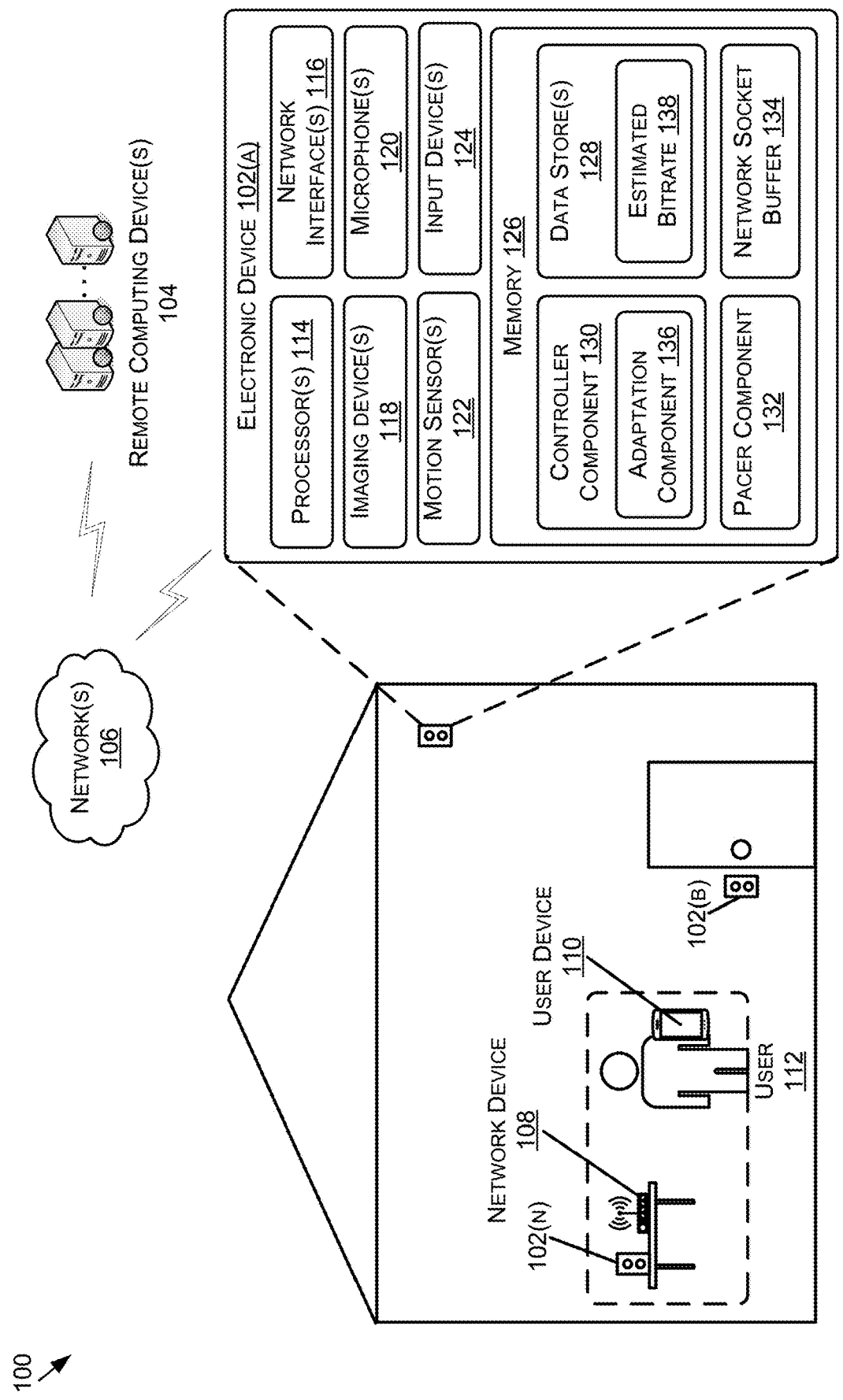
FIG. 1 illustrates an example environment for one or more electronic devices to capture image and/or audio data and send the image and/or audio data encoded as data packets to remote computing devices for processing, according to examples of the present disclosure.

This disclosure describes, in part, techniques for adapting bandwidth estimation algorithms to account for local network stalls, e.g. a WiFi stall. Specifically, the present disclosure relates to techniques for adapting bandwidth estimation algorithms utilized to improve streaming quality for video streams between an electronic device, configured as an A/V recording and communication device ("A/V device," may also be referred to herein as "electronic device"), and a user client device, using at least one server as an intermediary, to account for network stalls. Improved techniques to overcome deficiencies in existing bandwidth adaptation algorithms are provided by the present disclosure. For example, traditional bandwidth adaptation algorithms can reduce a bitrate (e.g. an estimated maximum bitrate (EMB)) used to configure an electronic device to send data packets through a network in response to an occurrence of a temporary stall associated with the network on which the electronic device is connected. As described herein, an electronic device may be configured to refrain from adjusting a bitrate for a period of time based on detection of such a network stall.

Electronic devices may generate and/or transmit various types of data (e.g., audio data, image data, sensor data, and/or the like) to a user device via one or more servers in real-time or near real-time. In some examples, the available bandwidth between the electronic devices, the server(s), and/or the user device may vary based on various configurations of the device(s) (e.g., a Wi-Fi network connection, a mobile network connection, etc.), the locations of the device(s) (e.g., a mobile user device often changing network types and/or connection strength), and/or the like. To stream this data in such a way that it can be viewed on a user device when such a user device has a fast network connection or a slow network connection, bandwidth estimation and bandwidth adaptation algorithms may be utilized to adjust the resolution of such streams being sent from electronic devices in response to control messages received from the one or more servers.

As described herein, a bandwidth adaptation algorithm may operate based on a receiver (e.g., one or more servers) determining an estimated bandwidth or bitrate for groups of received packets and sending that estimated bandwidth or bitrate back to an associated transmitted (e.g., an electronic device). Take, for example, a video stream where the video is encoded and then sent using real-time transport protocol (RTP) and user datagram protocol (UDP). A real-time transport control protocol (RTCP) message representing a receiver estimated maximum bitrate (REMB) message may be sent back from the receiver to the transmitter via RTCP. The transmitter may then use the received REMB message to adjust a bitrate used for transmission and/or encoding.

Alternatively, in accordance with one or more preferred implementations, a bandwidth adaptation algorithm operates based on a transmitter determining a estimated bandwidth or bitrate based on simple feedback messages returned by a receiver. A transmitter may determine an estimated bandwidth or bitrate, e.g., based on absolute send times and/or absolute receive times associated with the transmissions.

For example, an electronic device may utilize an RTP packetizer configured to generate RTP packets having an extension to indicate an absolute send time representing a time at which an RTP packet was sent from the electronic device, and one or more remote servers may utilize an RTP packetizer configured to generate RTCP messages indicating the absolute send time of the RTP packet and an absolute receive time representing a time at which the RTP packet was received by the one or more servers. The transmitter may then use the received RTCP messages including the absolute send time and/or the absolute receive time to determine an EMB for sending transmissions.

More specifically, a receiver provides transport-wide RTCP feedback messages indicating, for each RTP packet received, a packet identifier and a packet arrival time. The sender keeps a list of sent packets indicating the packet identifier and a sent time, and upon receiving a feedback message can determine a packet delay time based on the sent time and the arrival time. Packet delay times can be used to determine a latency value, e.g. an average latency value, for a set of packets.

A determined latency value can be utilized to determine a latency-based bandwidth estimation. In accordance with one or more preferred implementations, an electronic device updates a latency-based bandwidth estimation based upon receiving a transport-wide RTCP feedback message.

A receiver may also provide RTCP messages in the form of receiver reports and negative acknowledgments (NACKs).

In accordance with one or more preferred implementations, by matching packet identifiers in received RTCP messages with packet identifiers in a list of sent packets, the electronic device can determine that packets for which a positive indication of receipt has not been provided have been lost, allowing the electronic device to compute loss statistics or a loss value (although this computed loss will also be impacted by the loss of RTCP messages).

A determined loss value can be utilized to determine a loss-based bandwidth estimation. In accordance with one or more preferred implementations, an electronic device updates a loss-based bandwidth estimation based upon receiving a receiver report.

In accordance with one or more preferred implementations, an overall bandwidth estimation is the lesser of a loss-based bandwidth estimation and a latency-based bandwidth estimation.

Such bandwidth estimation techniques work well for increasing and/or decreasing an estimated bandwidth or bitrate over time based on analysis of these RTCP messages. However, the occurrence of a network stall associated with a network (e.g., a Wi-Fi network) connected to an electronic device (e.g., an A/V device) could lead to an unnecessary adjustment of the estimated bandwidth or bitrate. It is normal for the throughput of even strong Wi-Fi networks at the 100 millisecond (ms) level to be highly variable. For example, Wi-Fi stalls may occur for a number of reasons, such as, for example, signal congestion, priority at a routing device, proximity to a routing device, interference from objects and/or other devices emitting waves of various frequencies (e.g., a microwave), and the like. Take, for example, a scenario where an electronic device is connected to a Wi-Fi network supporting other devices (e.g., devices streaming media), a routing device may give priority to the other devices over the electronic device leading to a temporary inability to transmit packets generated by the electronic device. Such a temporary inability to successfully transmit Wi-Fi packets may be cured by burst transmission of a large number of packets. Thus, some variability of Wi-Fi throughput may not warrant a reduction in the bitrate used for transmission of such packets, and an electronic device may be configured to detect network stalls (e.g., Wi-Fi stalls) and refrain from adjusting the estimated bandwidth or bitrate for a period of time following the detection of such a stall.

An electronic device may be configured to implement process(es) for executing bandwidth adaptation accounting for network stalls. In some examples, the electronic device may be configured with additional components and/or functionality. For example, an electronic device may include one or more processors, one or more network interfaces, one or more imaging devices, one or more microphones, one or more speakers, one or more motion sensors, one or more input devices, one or more lighting devices, one or more power sources, and/or a memory.

An imaging device may include any device that includes an image sensor, such as a camera, that is capable of generating image data, representing one or more images (e.g., a video). The image sensor may include a video recording sensor and/or a camera chip. In one aspect of the present disclosure, the imager sensor may comprise a complementary metal-oxide semiconductor (CMOS) array and may be capable of recording high definition (e.g., 722 p, 1800 p, 4 K, 8 K, etc.) video files. The imaging device may include a separate camera processor, or the processor(s) may perform the camera processing functionality. The processor(s) (and/or camera processor) may include an encoding and compression chip. In some embodiments, the processor(s) (and/or the camera processor) may comprise a bridge processor. The processor(s) (and/or the camera processor) may process video recorded by the image sensor and may transform this data into a form suitable for transfer by the network interface(s). In various examples, the imaging device 508 also includes memory, such as volatile memory that may be used when data is being buffered or encoded by the processor(s) (and/or the camera processor). For example, in certain embodiments the camera memory may comprise synchronous dynamic random-access memory (SD RAM).

The motion sensors may be any type of sensor capable of detecting and communicating the presence of an object within their field of view. In some examples, the motion sensors may include, but are not limited to, active infrared sensors, passive infrared sensors, and/or any other type of infrared sensors. As described herein, an active infrared sensor may be configured to emit infrared radiation and then detect the emitted infrared radiation. As such, the active infrared sensor may include at least two parts, a light source (e.g., a light-emitting diode) and a receiver. During operation, when an object comes within proximity to the active infrared sensor, the infrared light that is emitted by the light source is reflected off of the object and detected by the receiver. The electronic device is then able to analyze sensor data that is output by the active infrared sensor in order to detect the presence of the object.

An input device may include, but is not limited to, a button, a touch-sensitive surface, a switch, a slider, and/or any other type of device that allows a user to provide input to the electronic device. For example, if the electronic device includes a doorbell, then the input device may include a doorbell button. In some examples, based on receiving an input, the processor(s) may receive a signal from the input device and use the signal to determine that the input device received the input. Additionally, the processor(s) may generate input data representing the input received by the input device(s). For example, the input data may represent the type of input (e.g., a push to a button), a time that the input occurred, and/or the like.

The power source(s) may include one or more batteries that provide power to the electronic device. However, in other examples, the electronic device may not include the power source(s). In such examples, the electronic device may be powered using a source of external AC (alternating-current) power, such as a household AC power supply (alternatively referred to herein as "AC mains" or "wall power"). The AC power may have a voltage in the range of 112-220 VAC, for example. The incoming AC power may be received by an AC/DC adapter (not shown), which may convert the incoming AC power to DC (direct-current) and may step down the voltage from 112-220 VAC to a lower output voltage of about 12 VDC and an output current of about 2 A, for example. In various embodiments, the output of the AC/DC adapter is in a range from about 5 V to about 15 V and in a range from about 0.5 A to about 5 A. These voltages and currents are exemplary and are not intended to be limiting.

The speaker(s) may be any electromechanical device capable of producing sound in response to an electrical signal input. The microphone(s) may be an acoustic-to-electric transducer or sensor capable of converting sound waves into audio data representing the sound. The speaker(s) and/or microphone(s) may be coupled to an audio CODEC to enable digital audio received by user devices to be decompressed and output by the speaker(s) and/or to enable audio data captured by the microphone(s) to be compressed into digital audio data. The digital audio data may be received from and sent to user devices using one or more remote systems. In some examples, the electronic device includes the speaker(s) and/or the microphone(s) so that the user associated with the electronic device can communicate with one or more other users located proximate to the electronic device. For example, the microphone(s) may be used to generate audio data representing the speech of the one or more other users, which is then sent to the user device. Additionally, the speaker(s) may be configured to output user speech of the user, where the user's user speech may also be represented by audio data.

The electronic device may further store a controller component, a pacer component, a network socket buffer, and/or one or more data store(s). The controller component may be configured to perform various operations to implement the bandwidth estimation algorithm, adapted to handle network stalls. Additionally, or alternatively, the controller component may comprise one or more sub-components, such as, for example, an adaptation component configured to implement one or more adaptation algorithms, an encoding component configured to encode audio data and/or image data based on an EMB, and/or an encryption component configured to encrypt data packets prior to transmission over a network. Additionally, or alternatively, the one or more data store(s) may store various data generated by the electronic device and/or utilized by the controller component (or subcomponents thereof), the pacer component, and/or the network socket buffer.

The data store(s) may be configured to store image data generated by the imaging device(s), audio data generated by the microphone(s), sensor data generated by the motion sensor(s), packet(s) generated by the electronic device, timing data representing send times and/or receive times associated with the packets, an estimated bandwidth or bitrate, and/or a delay threshold indicating a period of time to refrain from adjusting an estimated bandwidth or bitrate.

The encoding component may utilize various encoding techniques to encode packets with information that specifies a targeted bitrate. For example, the encoding component may be configured as an advanced video encoder (e.g., an H.264 encoder). The encoding component may utilize an estimated bandwidth or bitrate or a bitrate determined based on an estimated bandwidth or bitrate when encoding packets. Indeed, in some implementations, a packet may indicate an estimated bandwidth or bitrate as a targeted bitrate for transmission of the packet. Additionally, or alternatively, the encoding component may utilize a packetizer to generate the packets based on the encoded image and/or audio data. In some examples, the packetizer may be configured to generate a packet, such as, for example, an RTP packet, having an RTP extension configured to indicate an absolute send time of a corresponding packet.

The pacer component may perform various operations to smooth a sending bitrate of the electronic device. In some examples, the pacer component may comprise a first queue configured to store data packets (e.g., RTP packets) generated by the electronic device. For example, following generation of image data and/or audio data by an imaging device and/or a microphone of the electronic device, a data packet comprising the encoded image data and/or audio data may be generated and stored in the first queue of the pacer component. The pacer component may be configured to send packets from the first queue to a network socket buffer that can be characterized as a second queue. The pacer component may utilize an estimated bandwidth or bitrate to determine a number of bytes that it can send. In some examples, the pacer component may operate in a periodic mode utilizing time intervals (e.g., 5 ms) and sends new packets no more often than each time interval and may determine a number of bytes to send during a given time window based on an estimated bandwidth or bitrate. Additionally, or alternatively, the pacer component may operate in a dynamic mode such that no minimum duration between packet send times is defined, and the pacer can send at a dynamic rate that may increase when time passes without sending a packet and may decrease when a packet is sent. In some examples, the first queue may be configured as a first-in-first-out (FIFO) queue, such that first packets that are added to the queue before second packets will be removed from the queue before the second packets. Additionally, or alternatively, the first queue may be configured to store a first number of packets and the second queue may configured to store a second number of packets, where the first number of packets is greater than the second number of packets.

A network driver or other component or module may perform various operations to determine whether packets in the socket buffer can be sent over a channel. As noted above, the network socket buffer may be characterized as a second queue. The network socket buffer is configured to store packets that are to be sent by the electronic device over the network. For example, the network socket buffer may receive a packet from the pacer component that was previously stored in the first queue. The second queue may be configured to be substantially smaller in size than the first queue. A component or module such as the network driver may dequeue a packet from the second queue and transmit the packet over Wi-Fi to a routing device, where the packet may be routed to the cloud (e.g., one or more remote computing devices) by the routing device.

When a network stall occurs on the Wi-Fi network, a network driver may be unable to send any packets from the network socket buffer over the Wi-Fi network to the routing device. As such, the packet may not be removed from the second queue, while additional packets received from the pacer component may continue to accumulate in the second queue.

In accordance with one or more preferred implementations, prior to attempting to pass a packet from the first queue to the socket buffer, the pacer component determines or queries whether the socket buffer is full. In accordance with one or more preferred implementations, when the pacer component tries to enqueue a packet at a full socket buffer, the socket buffer provides an indication of the full socket buffer.

In accordance with one or more preferred implementations, a determination by the system (e.g. based on or representing a determination by the pacer queue) that the network socket buffer is full can be characterized as suggesting the occurrence of a local network stall, e.g. a WiFi stall. That is, a determination that the network socket buffer is at capacity may indicate the occurrence of a network stall associated with a Wi-Fi or other local network. This indication may be utilized by an adaptation component to implement an adaptation algorithm.

As previously described, an adaptation component may be configured to implement one or more adaptation algorithms. For example, the adaptation component may be configured to determine that a network stall has occurred on a network associated with the electronic device. In some examples, the adaptation component may be configured to monitor the network socket buffer to determine when it is at capacity. Additionally, or alternatively, the adaptation component may communicate with the pacer component and/or the network socket buffer to receive indications that a network stall has occurred.

The adaptation component may implement adaptation algorithms including process(es) to determine whether or not to adjust an estimated bandwidth or bitrate. For example, a process may include storing a first data packet generated by the electronic device in a first queue of the pacer component. Additionally, or alternatively, the process may include determining if the network socket buffer is full, according to the various techniques described herein. For example, the pacer component may send a second data packet to the network socket buffer and may receive a response from the network socket buffer indicating that the second queue is full. Additionally, or alternatively, the pacer component may send a request to add the second data packet from the first queue to the network socket buffer, and the network driver or network socket buffer may send a response indicating that the second queue is full. Additionally, or alternatively, the controller component may be configured to monitor the network socket buffer and determine when the network socket buffer is at capacity. If it is determined that the network socket buffer is not full, the process may include removing the second packet from the first queue and adding the second packet to the network socket buffer. Additionally, or alternatively, if it is determined that the network socket buffer is full, the process may include determining that a network stall associated with the network has occurred.

The process may then continue when a feedback or control message is received from a remote computing device. As described hereinabove, the feedback or control message may indicate an absolute send time and/or an absolute receive time associated with a given packet. In some examples utilizing receiver-side bandwidth estimation, the control message may indicate an estimated bandwidth or bitrate associated with a group of packets.

The process may then continue to determine if a network stall has been detected. In examples where a network stall has not been detected within a threshold period of time (e.g., a period of time from when the last packet was sent from the electronic device), the process may include determining an adjusted estimated bandwidth or bitrate based on the control message. In some examples, the adjusted estimated bandwidth or bitrate may be determined by the electronic device based on an absolute send time and/or an absolute receive time associated with a packet and indicated by a feedback or control message. Additionally, or alternatively, the adjusted estimated bandwidth or bitrate may be determined by a remote computing device and included in a control message returned to the electronic device. In some examples, the controller may be configured to determine the adjusted estimated bandwidth or bitrate and may store the adjusted estimated bandwidth or bitrate and utilize the adjusted estimated bandwidth or bitrate instead of the original estimated bandwidth or bitrate to encode and/or send packets.

Additionally, or alternatively, in examples where a network stall has been detected, the process may include refraining from adjusting the estimated bandwidth or bitrate for a period of time. In some examples, the period of time may be configured as a fixed interval (e.g., 50 ms, 100 ms, 150 ms, etc.). Additionally, or alternatively, the period of time may be configured as a dynamic interval. In some examples, the adaptation component may be configured to cause the controller component to refrain from determining the adjusted estimated bandwidth or bitrate and/or storing an adjusted estimated bandwidth or bitrate for the period of time. While the example period of time of 150 ms is provided above, and period of time greater than 0ms may be utilized as a period of time to refrain from adjusting the estimated bandwidth or bitrate.

In accordance with one or more preferred implementations, an electronic device operates in a first state in which RTP packets representing encoded video and/or audio are communicated from the electronic device to a remote computing system, and transport-wide RTCP feedback messages are sent back to the electronic device from the remote computing device indicating packet identifiers and arrival times for sent RTP packets.

These transport-wide RTCP feedback messages are utilized to determine a latency-based bandwidth estimation. In accordance with one or more preferred implementations, an electronic device operating in the first state updates a latency-based bandwidth estimation upon receiving a transport-wide RTCP feedback message (e.g. upon each received RTCP feedback message).

The remote computing system also provides RTCP messages in the form of receiver reports.

These receiver reports are utilized to determine a loss-based bandwidth estimation. In accordance with one or more preferred implementations, an electronic device updates a loss-based bandwidth estimation upon receiving a receiver report (e.g. upon each received receiver report).

In accordance with one or more preferred implementations, an overall bandwidth estimation is determined as the lesser of a loss-based bandwidth estimation and a latency-based bandwidth estimation. This bandwidth estimation may be evaluated for update every time a loss-based or delay-based bandwidth estimation is updated.

In accordance with one or more preferred implementations, the bandwidth estimation is utilized to determine a bitrate used for encoding video and/or sending RTP packets.

In accordance with one or more preferred implementations, based on determining that a socket buffer is full and/or remains full for a first threshold period of time, a first state flag is set indicating a second state. In the second state, the electronic device continues to utilize the RTCP feedback messages to determine or adjust an estimated latency-based bandwidth estimation.

Subsequently, based on determining that the socket buffer is no longer full and based on the operating in the second state (e.g. based on the first state flag being set to indicate the second state), a timer is started and a second state flag (or the first state flag) is set indicating the third state.

While operating in the third state, the electronic device continues to utilize RTCP feedback messages to determine or update a latency-based bandwidth estimation, but if this determined latency-based bandwidth estimation is lower than a previously determined latency-based bandwidth estimation (e.g. the most recent latency-based bandwidth estimation determined prior to entering the third state), then it is discarded and not used to update a stored current latency-based bandwidth estimation or a stored current overall bandwidth estimation.

On the other hand, while operating in the third state, if this determined latency-based bandwidth estimation is higher than a previously determined latency-based bandwidth estimation (e.g. the most recent latency-based bandwidth estimation determined prior to entering the third state), then it is used to update a stored current latency-based bandwidth estimation and (if lower than a stored current loss-based bandwidth estimation) a stored current overall bandwidth estimation.

Notably, while operating in the third state, received receiver reports are still used to determine or update a loss-based bandwidth estimation and (if lower than a stored current latency-based bandwidth estimation) a stored current overall bandwidth estimation.

Based on expiration of a time period (determined based on the timer), the electronic device returns to the first state.

FIG. 1 illustrates an example environment 100 for implementing a bandwidth adaptation algorithm. In some examples, the environment 100 may include one or more electronic devices 102(A)-(N) to capture image and/or audio data and send the image and/or audio data encoded as packets (e.g., RTP packets) to remote computing devices 104 over one or more networks 106 for processing, according to examples of the present disclosure. As shown, an electronic device 102(a), 102(b) may be connected to a home or other structure, such as proximate to an entrance of the home (e.g., an electronic device 102(b) configured as a doorbell camera device) and/or fixed at a point on the exterior of the home to provide a greater field of view (e.g., an electronic device 102(a) configured as a security camera device). Additionally, as illustrated, an electronic device 102(n) may be positioned inside of a home (e.g., an electronic device 102(n) configured as an indoor security camera device). Additionally, the home may include a network device 108, such as, for example a router, a modem, and/or a router modem. The network device 108 may be configured to provide a Wi-Fi connection usable by the electronic device(s) 102 and/or a user device 110 of a user 112.

An electronic device 102 may be configured as an A/V recording and communication device to implement process(es) for executing the bandwidth adaptation accounting for network stalls. In some examples, the electronic device 102 may be configured with additional components and/or functionality. For example, an electronic device 102 may include one or more processors 114, one or more network interfaces 116, one or more imaging devices 118, one or more microphones 120, one or more motion sensors 122, one or more input devices 124, and/or a memory 126. Additionally, the electronic device 102 may include additional components other than those illustrated in FIG. 1, such as, for example, one or more speakers, one or more lighting devices, and/or one or more power sources.

The memory 126 may further comprise one or more data store(s) 128, a controller component 130, a pacer component 132, and/or a network socket buffer 134. The controller component 130 may be configured to perform various operations to implement the bandwidth estimation algorithm, adapted to handle network stalls. Additionally, or alternatively, the controller component 130 may comprise one or more sub-components, such as, for example, an adaptation component 136 configured to implement one or more adaptation algorithms. Additionally, or alternatively, the one or more data store(s) 128 may store various data generated by the electronic device 102 and/or utilized by the controller component 130 (or subcomponents thereof), the pacer component 132, and/or the network socket buffer 134.

The pacer component 132 may perform various operations to smooth the sending bitrate of the electronic device 102. In some examples, the pacer component 132 may comprise a first queue configured to store data packets (e.g., RTP packets) generated by the electronic device 102. Additionally, or alternatively, the network socket buffer 134 may perform various operations to detect an occurrence of a network stall associated with a network that the electronic device 102 is connected to. The network socket buffer 134 may comprise a second queue configured to store packets that are to be sent by the electronic device 102 over the network.

Figure 2:
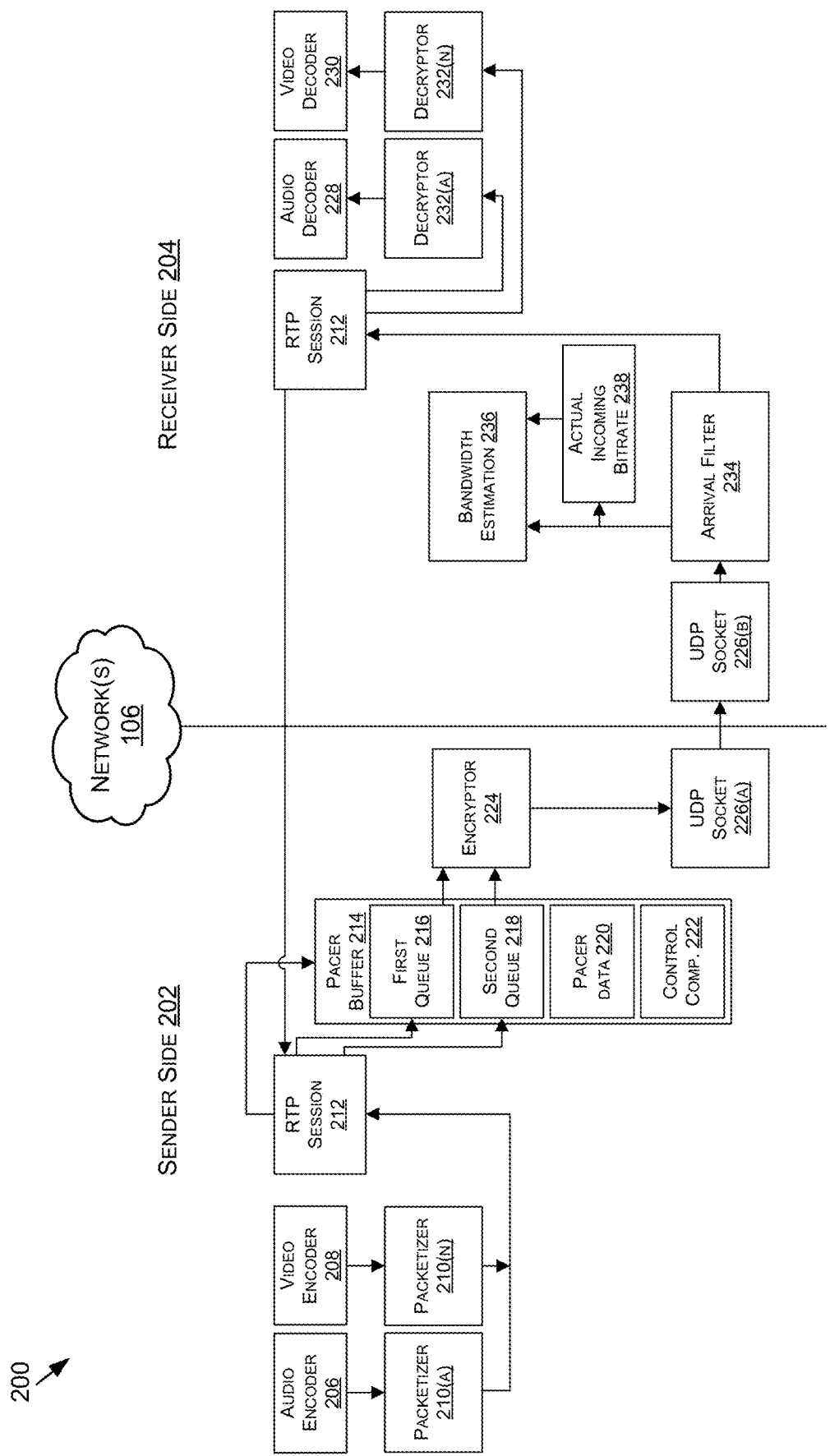
FIG. 2 illustrates an example architecture for implementing a bandwidth estimation algorithm adapted to account for network stalls, according to the examples of the present disclosure.

In some embodiments, the bandwidth adaptation algorithm may be implemented using the example architecture 200 as illustrated by FIG. 2 (or a substantially similar architecture). Referring to FIG. 2, the bandwidth adaptation algorithm may be implemented by configuring an electronic device 102 on a sender side 202 of the networks 106 and/or by configuring one or more remote computing devices 104 on a receiver side 204 of the networks 106.

The sender side 202 of the architecture 200 (e.g., the electronic device 102) may include, for example, an audio encoder 206 configured to encode the audio data based on the estimated bandwidth or bitrate, a video encoder 208 configured to encode the image data and/or video data based on the estimated bandwidth or bitrate, one or more packetizers 210(a)-(n) configured to generate packets (e.g., RTP packets) to send over an RTP session 212 from the sender side 202 to the receiver side 204. In some examples, the audio encoder 206 and/or the video encoder 208 may be configured with an RTP extension to indicate an absolute send time associated with a given packet.

Additionally, or alternatively, the sender side 202 of the architecture 200 may include a pacer buffer 214 comprising a first queue 216, a second queue 218, pacer data 220, and/or a control component 222. In some examples, the pacer buffer 214 and/or the control component 222 may correspond to the pacer component 132 and/or the controller component 130 of the electronic device 102, as described with respect to FIG. 1, respectively. In some examples, the pacer buffer 214 may comprise substantially similar components and/or functionality to the network socket buffer 134 as described with respect to FIG. 1. For example, the first queue 216 of the pacer buffer 214 may correspond to a first queue 318 of the pacer component 130, and the second queue 218 of the pacer buffer 214 may correspond to the second queue 320 of the network socket buffer 134, as described in more detail with respect to FIG. 3.

The sender side 202 of the architecture 200 may also comprise an encryptor 224 configured to encrypt the packets prior to transmission from the electronic device 102 over the networks 106 to the receiver sider 204 by way of a first UDP socket 226(a) connected to a second UDP socket 226(b) of the receiver side 204 of the architecture 200.

The receiver side 204 of the architecture 200 (e.g., the remote computing device(s) 104), may include, for example, an audio decoder 228 configured to decode the audio data, a video decoder 230 configured to decode the image data and/or video data, one or more decryptor(s) 232(a)-(n) configured to decrypt the packets encrypted by the encryptor 224 and received at the receiver side 204 via the RTP session 212 from the sender side 202. In some examples, the audio decoder 228 and/or the video decoder 230 may be configured with an RTP extension to decode the absolute send time associated with a given packet.

Additionally, or alternatively, the receiver side 204 of the architecture 200 may include an arrival filter 234 configured to group received packets based on their absolute send time and/or a bandwidth estimation component 236. The arrival filter 234 may send various information associated with the packets to the bandwidth estimation component 236, such as, for example, PTS signals, DTS signals, and/or a size of the packet. The bandwidth estimation component 236 may utilize the actual incoming bitrate 238 of the packets to calculate an estimated bandwidth to return as a control message (e.g., an RTCP message) indicating an adjusted estimated bandwidth or bitrate, an absolute send time associated with packet(s), and/or a an absolute receive time associated with the packet(s).

Take, for example, the electronic device 102 as described with respect to FIG. 1 configured with the sender side 202 architecture 200 as described with respect to FIG. 2, and the remote computing device(s) 104 as described with respect to FIG. 1 configured with the receiver side 204 architecture 200 as described with respect to FIG. 2. The imaging device(s) 118 and/or microphone(s) 120 of the electronic device 102 may generate image data and/or audio data, and the audio encoder 206 and/or the video encoder 208 may encode the image data and/or audio data, and utilize the packetizers 210 to generate packets (e.g., RTP packets) based on the encoded image and/or audio data. From there, the RTP packets may be sent to a first queue 216 of the pacer buffer 214. The pacer buffer 214 may send packets to a UDP socket buffer (e.g., the second queue 218). While not illustrated by FIG. 2, the second queue 218 may be configured as the UDP socket buffer. The pacer buffer 214 may utilize the pacer data 220, storing information such as the estimated bandwidth or bitrate, for example, to determine a number of bytes that it can send. In some examples, the pacer buffer 214 may operate in a periodic mode utilizing time intervals (e.g., 5 ms) and sends new packets no more often than each time interval and may determine a number of bytes to send during a given time window based on the estimated bandwidth or bitrate. Additionally, or alternatively, the pacer buffer 214 may operate in a dynamic mode such that no minimum duration between packet send times is defined, and the pacer buffer 214 can send at a dynamic rate that may increase when time passes without sending a packet and may decrease when a packet is sent.

The data packets from the UDP socket buffer (e.g., in the second queue 218) may then be encrypted and transmitted over Wi-Fi via the first UDP socket 226(a) of the sender side 202, where it is received by the second UDP socket 226(b) of the receiver side 204.

On the receiver side 204, the arrival filter 234 may receive the packets from the second UDP socket 226(b) and may group the packets based on their absolute send time indicated by the RTP extension offered by the packetizers 210. The bandwidth estimation component 236 may then generate an estimated bandwidth or bitrate based on an actual incoming bitrate of the grouped packets. The receiver side 204 may then send an RTCP packet indicating the estimated bandwidth or bitrate, the absolute send time, and/or the absolute receive time back to the sender side 202. Upon receiving the RTCP packet, the electronic device 102 may determine whether or not to adjust the estimated bandwidth or bitrate based on the RTCP packet.

Figure 3:
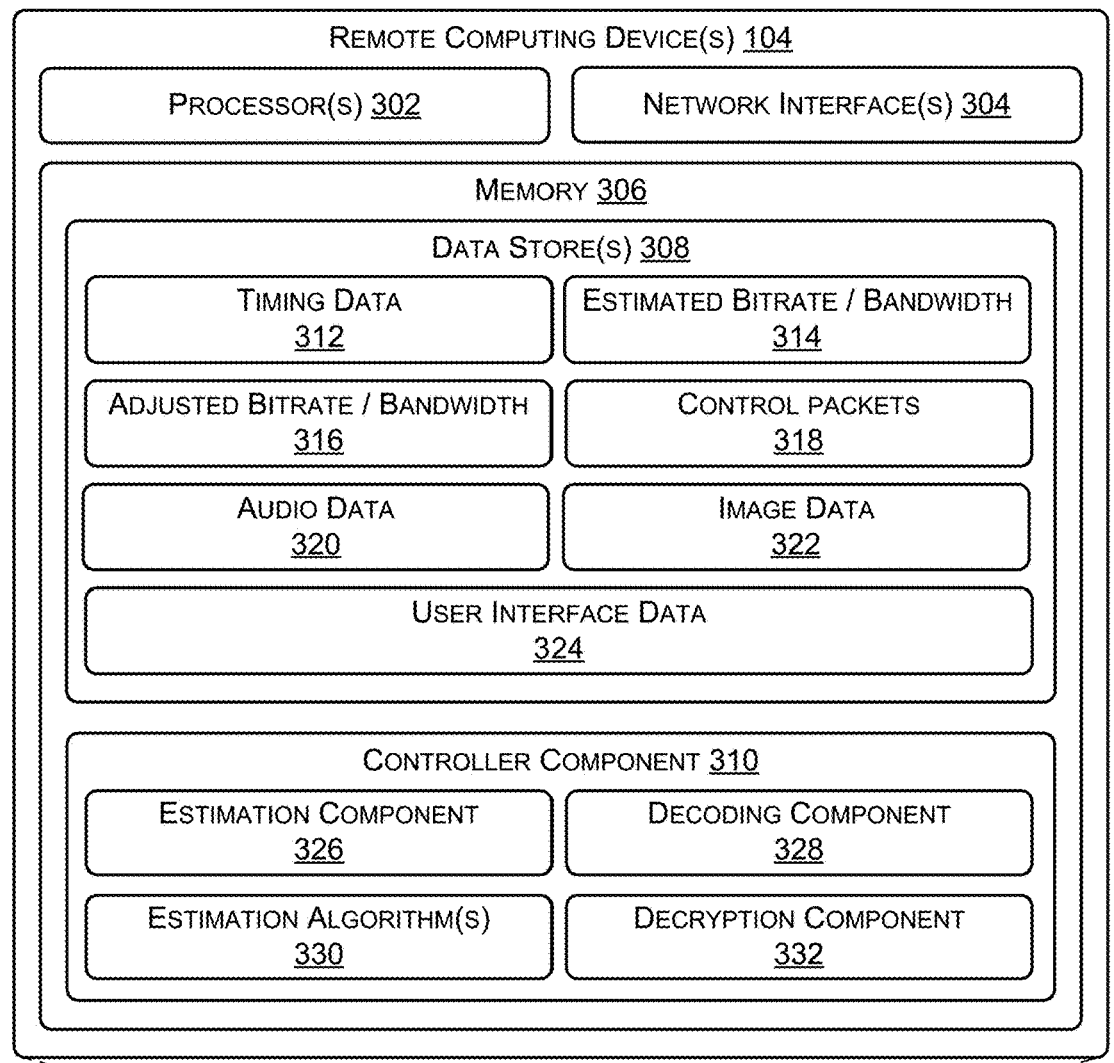
FIG. 3 illustrates a component diagram of an example electronic device for generating video data, audio data, data packets, and/or the like, and implementing a bandwidth estimation algorithm adapted to account for network stalls, according to the examples of the present disclosure.
Figure 3:
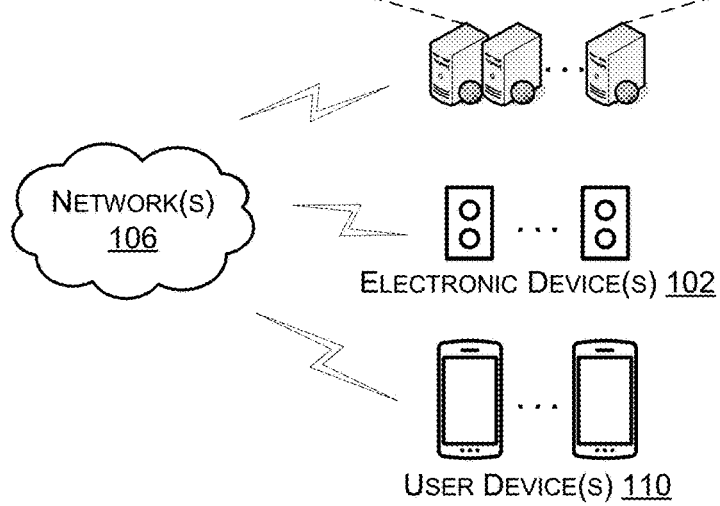

Referring back to FIG. 1, the electronic device 102 may utilize the bandwidth adaptation techniques described herein to increase and/or decrease the estimated bandwidth or bitrate 138 over time based on analysis of such RTCP messages received from the remote computing devices 104. In one or more preferred implementations, the electronic device 102 (e.g., the sender/transmitter) may be configured to utilize an absolute send time and/or an absolute receive time associated with packets as indicated by an RTCP message to generate an adjusted estimated bandwidth or bitrate, as described in more detail with respect to FIG. 4. Additionally, or alternatively, the remote computing device(s) 104 may be configured to generate an adjusted estimated bandwidth or bitrate and send the adjusted estimated bandwidth or bitrate back to the electronic device 102. Referring to FIG. 3, the remote computing device(s) 104 may include one or more processor(s) 302, one or more network interface(s) 304, and/or a memory 306. In some examples, the memory 306 may include one or more data store(s) 308 and/or a controller component 310.

In some examples, the controller component 310 may comprise substantially similar components and/or functionality as the controller component 130 of the electronic device 102, as described with respect to FIG. 1, such as, for example, an estimation component 326 configured to implement one or more estimation algorithm(s) 330, a decoding component 328, and/or a decryption component 332. That is, the remote computing device(s) 104 may utilize the controller component 310 to implement the bandwidth estimation algorithm in configurations where the remote computing devices 104 are configured to generate an estimated bandwidth and send the estimated bandwidth back to the electronic device by way of an RTCP packet. In such a configuration, the electronic device 102 may utilize the adaptation component 136 of the controller component 130 to implement the bandwidth estimation adaption algorithm to account for detected network stalls.

The data store(s) may be configured to store timing data 312 indicating the absolute send times and/or absolute receive times of packets, an estimated bandwidth or bitrate 314 associated with a given group of packets, an adjusted estimated bandwidth or bitrate 316 for a given group of packets, control packets 318 (e.g., RTCP packets) to be transmitted back to the electronic device 102, audio data 320 generated by the microphone(s) 120 of the electronic device 102, image data 322 generated by the imaging device(s) 118 of the electronic device 102, and/or user interface data 324 configured to be displayed on a display of the user device 110. Additionally, while not illustrated, the data store(s) 308 may be configured to store sensor data generated by the motion sensor(s) 122 of the electronic device 102.

In such embodiments where the remote computing device(s) 104 are configured to utilize the control component 310 to implement the bandwidth estimation algorithm, real-time transport control protocol (RTCP) messages representing a receiver estimated maximum bitrate (REMB) message may be sent back from the remote computing device(s) 104 (e.g., the receiver side 204 of the architecture 200, as described with respect to FIG. 2) to the electronic device 102 (e.g., the sender side 202 of the architecture 200, as described with respect to FIG. 2) via RTCP.

As described herein, at least some of the processes of the electronic device 102 may be executed by the remote computing device(s) 104.

Referring back to FIG. 1, the electronic device 102 may then use the received REMB message to adjust the estimated bandwidth or bitrate 138 used for transmission and/or encoding. Additionally, or alternatively, in accordance with one or more preferred implementations, the bandwidth estimation algorithm may operate based on the electronic device 102 determining an estimated bandwidth or bitrate based on simple feedback messages returned by a receiver (e.g., the remote computing devices 104). A transmitter (e.g., the electronic device 102) may determine an estimated bandwidth or bitrate e.g., based on absolute send times and/or absolute receive times indicated by the RTCP packets, as previously described. For example, an electronic device 102 may utilize an RTP packetizer, such as, for example, the packetizers 210 as described with respect to FIG. 2, to generate RTP packets having an RTP extension to indicate an absolute send time representing a time at which an RTP packet was sent from the electronic device 102, and the one or more remote computing devices 104 may generate RTCP messages indicating the absolute send time of the RTP packet and an absolute receive time representing a time at which the RTP packet was received by the one or more remote computing devices. The electronic device 102 may then use the received RTCP messages including the absolute send time and/or the absolute receive time to determine the estimated bandwidth or bitrate 138 for sending transmissions.

More specifically, the remote computing devices 104 provides transport-wide RTCP feedback messages indicating, for each RTP packet received, a packet identifier and a packet arrival time. The electronic device 102 keeps a list of sent packets indicating the packet identifier and a sent time, and upon receiving a feedback message can determine a packet delay time based on the sent time and the arrival time. Packet delay times can be used to determine a latency value, e.g. an average latency value, for a set of packets.

A determined latency value can be utilized to determine a latency-based bandwidth estimation. In accordance with one or more preferred implementations, the electronic device 102 updates a latency-based bandwidth estimation based upon receiving a transport-wide RTCP feedback message.

The remote computing devices 104 may also provide RTCP messages in the form of receiver reports and negative acknowledgments (NACKs).

In accordance with one or more preferred implementations, by matching packet identifiers in received RTCP messages with packet identifiers in a list of sent packets, the electronic device 102 can determine that packets for which a positive indication of receipt has not been provided have been lost, allowing the electronic device 102 to compute loss statistics or a loss value (although this computed loss will also be impacted by the loss of RTCP messages).

A determined loss value can be utilized to determine a loss-based bandwidth estimation. In accordance with one or more preferred implementations, the electronic device 102 updates a loss-based bandwidth estimation based upon receiving a receiver report from the remote computing devices 102.

In accordance with one or more preferred implementations, an overall bandwidth estimation is the lesser of a loss-based bandwidth estimation and a latency-based bandwidth estimation.

As previously described, such bandwidth estimation techniques work well for increasing and/or decreasing estimated bandwidth or bitrate over time based on analysis of these RTCP messages. However, the occurrence of a network stall associated with a network (e.g., a Wi-Fi network) connected to an electronic device 102 could lead to an unnecessary adjustment of the estimated bandwidth or bitrate 138, since it is normal for the throughput of even strong Wi-Fi networks at the 100 millisecond (ms) level to be highly variable. For example, Wi-Fi stalls may occur for a number of reasons, such as, for example, signal congestion, priority at a routing device 108, proximity to a routing device 108, interference from objects and/or other devices emitting waves of various frequencies (e.g., a microwave), and the like. Take, for example, a scenario where an electronic device 102 is connected to a Wi-Fi network supporting other devices (e.g., devices streaming media), a routing device 108 may give priority to the other devices over the electronic device 102 leading to a temporary inability to transmit packets generated by the electronic device 102. Such a temporary inability to successfully transmit Wi-Fi packets may be cured by burst transmission of a large number of packets. Thus, some variability of Wi-Fi throughput may not warrant a reduction in the bitrate used for transmission of such packets, and an electronic device 102 may be configured to detect network stalls (e.g., Wi-Fi stalls) and refrain from adjusting the estimated bandwidth or bitrate 138 for a period of time following the detection of such a stall. Such configuration of an electronic device 102 having components and/or functionality configured to implement the bandwidth adaptation algorithm may be illustrated by FIG. 4.

Figure 4:
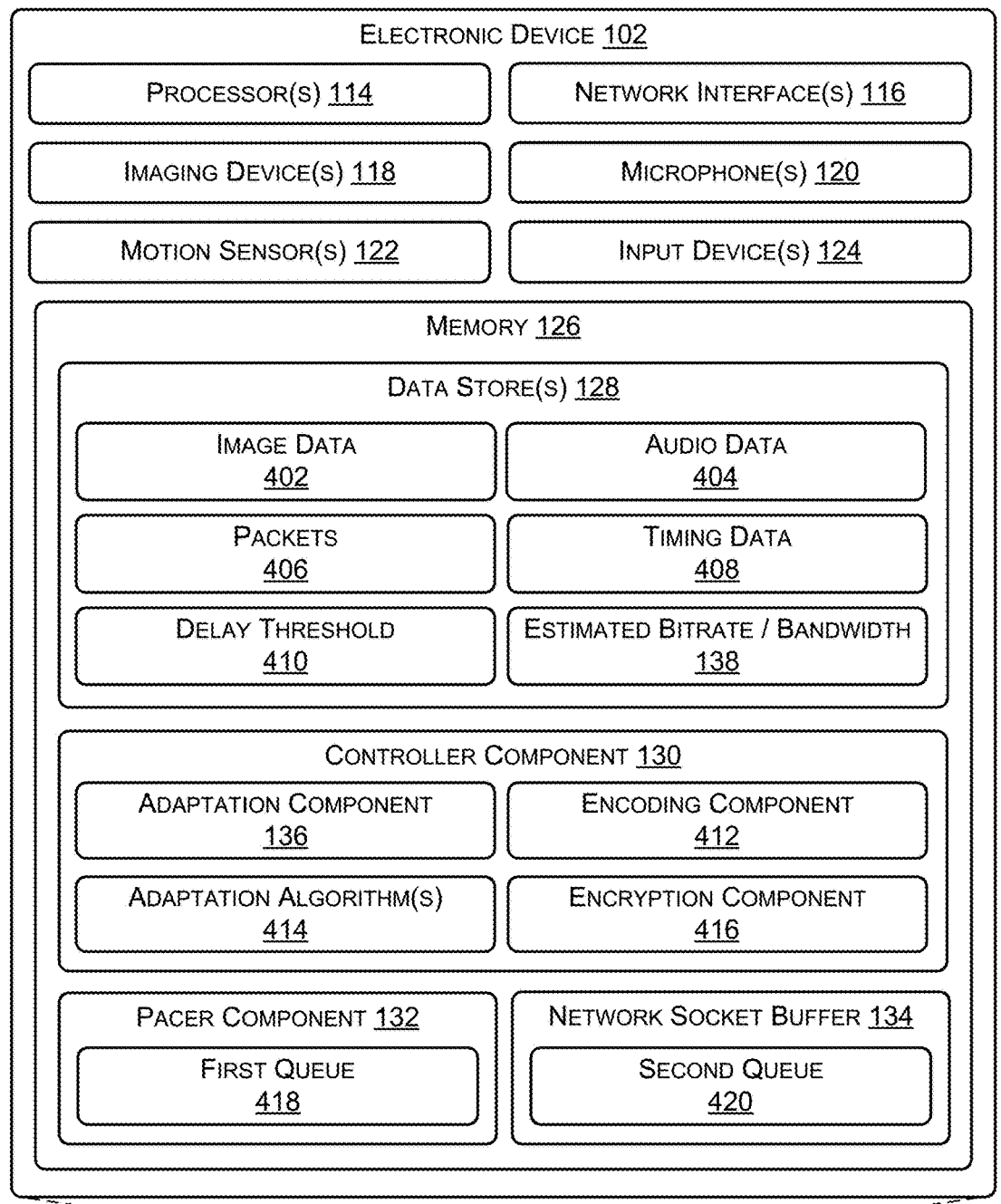
FIG. 4 illustrates a component diagram of an example remote computing device implementing a bandwidth estimation algorithm adapted to account for network stalls, according to the examples of the present disclosure.

Referring to FIG. 4, the electronic device 102 may be configured to implement process(es) for executing the bandwidth adaptation accounting for network stalls. In some examples, the electronic device 102 may be configured with additional components and/or functionality. For example, an electronic device 102 may include one or more processors 114, one or more network interfaces 116, one or more imaging devices 118, one or more microphones 120, one or more motion sensors 122, one or more input devices 124, and/or a memory 126. Additionally, or alternatively, while not illustrated by FIG. 4, the electronic device may further include one or more speakers, one or more lighting devices, and/or one or more power sources.

An imaging device 118 may include any device that includes an image sensor, such as a camera, that is capable of generating image data 402, representing one or more images (e.g., a video). The image sensor may include a video recording sensor and/or a camera chip. In one aspect of the present disclosure, the imager sensor may comprise a complementary metal-oxide semiconductor (CMOS) array and may be capable of recording high definition (e.g., 722*p*, 1800*p*, 4K, 8K, etc.) video files. The imaging device 118 may include a separate camera processor, or the processor(s) may perform the camera processing functionality. The processor(s) 114 (and/or camera processor) may include an encoding and compression chip. In some embodiments, the processor(s) (and/or the camera processor) may comprise a bridge processor. The processor(s) 114 (and/or the camera processor) may process video recorded by the image sensor and may transform this data into a form suitable for transfer by the network interface(s) 116. In various examples, the imaging device 508 also includes memory 126, such as volatile memory that may be used when data is being buffered or encoded by the processor(s) 114 (and/or the camera processor). For example, in certain embodiments the camera memory may comprise synchronous dynamic random-access memory (SD RAM).

The speaker(s) may be any electromechanical device capable of producing sound in response to an electrical signal input. The microphone(s) 120 may be an acoustic-to-electric transducer or sensor capable of converting sound waves into audio data representing the sound. The speaker(s) and/or microphone(s) 120 may be coupled to an audio CODEC to enable digital audio received by user devices 110 to be decompressed and output by the speaker(s) and/or to enable audio data 404 captured by the microphone(s) 120 to be compressed into digital audio data 404. The digital audio data 404 may be received from and sent to user devices 110 using one or more remote systems 104. In some examples, the electronic device 102 includes the speaker(s) and/or the microphone(s) 120 so that the user 112 associated with the electronic device 102 can communicate with one or more other users located proximate to the electronic device 102. For example, the microphone(s) 120 may be used to generate audio data 404 representing the speech of the one or more other users, which is then sent to the user device 110. Additionally, the speaker(s) may be configured to output user speech of the user 112, where the user's 112 user speech may also be represented by audio data 404.

The motion sensors 122 may be any type of sensor capable of detecting and communicating the presence of an object within their field of view. In some examples, the motion sensors 122 may include, but are not limited to, active infrared sensors, passive infrared sensors, and/or any other type of infrared sensors. As described herein, an active infrared sensor may be configured to emit infrared radiation and then detect the emitted infrared radiation. As such, the active infrared sensor may include at least two parts, a light source (e.g., a light-emitting diode) and a receiver. During operation, when an object comes within proximity to the active infrared sensor, the infrared light that is emitted by the light source is reflected off of the object and detected by the receiver. The electronic device 102 is then able to analyze sensor data that is output by the active infrared sensor in order to detect the presence of the object.

An input device 124 may include, but is not limited to, a button, a touch-sensitive surface, a switch, a slider, and/or any other type of device that allows a user 112 to provide input to the electronic device 102. For example, if the electronic device 102 includes a doorbell, then the input device 124 may include a doorbell button. In some examples, based on receiving an input, the processor(s) 114 may receive a signal from the input device 124 and use the signal to determine that the input device received the input. Additionally, the processor(s) may generate input data representing the input received by the input device(s). For example, the input data may represent the type of input (e.g., a push to a button), a time that the input occurred, and/or the like.

The power source(s) may include one or more batteries that provide power to the electronic device 102. However, in other examples, the electronic device 102 may not include the power source(s). In such examples, the electronic device 102 may be powered using a source of external AC (alternating-current) power, such as a household AC power supply (alternatively referred to herein as "AC mains" or "wall power"). The AC power may have a voltage in the range of 112-220 VAC, for example. The incoming AC power may be received by an AC/DC adapter (not shown), which may convert the incoming AC power to DC (direct-current) and may step down the voltage from 112-220 VAC to a lower output voltage of about 12 VDC and an output current of about 2 A, for example. In various embodiments, the output of the AC/DC adapter is in a range from about 5 V to about 15 V and in a range from about 0.5 A to about 5 A. These voltages and currents are exemplary and are not intended to be limiting.

As previously described with respect to FIG. 1, the electronic device 102 may further store a controller component 130, a pacer component 132, a network socket buffer 134, and/or one or more data store(s) 128. The controller component 130 may be configured to perform various operations to implement the bandwidth estimation algorithm, adapted to handle network stalls. Additionally, or alternatively, the controller component 130 may comprise one or more sub-components, such as, for example, an adaptation component 136 configured to implement one or more adaptation algorithms 414, an encoding component 412 configured to encode audio data and/or image data based on an estimated bandwidth or bitrate 138, and/or an encryption component configured to encrypt data packets prior to transmission over a network 106. Additionally, or alternatively, the one or more data store(s) 128 may store various data generated by the electronic device 102 and/or utilized by the controller component 130 (or subcomponents thereof), the pacer component 132, and/or the network socket buffer 134.

The data store(s) 126 may be configured to store image data 402 generated by the imaging device(s) 118, audio data 404 generated by the microphone(s) 120, sensor data generated by the motion sensor(s) 122, packet(s) 406 generated by the electronic device 102, timing data 408 representing send times and/or receive times associated with the packets 406, an estimated bandwidth or bitrate 138, and/or a delay threshold 410 indicating a period of time to refrain from adjusting an estimated bandwidth or bitrate 138.

The encoding component 412 may utilize various encoding techniques to encode packets 406 with information that specifies a targeted bitrate. For example, the encoding component 412 may be configured as an advanced video encoder (e.g., an H.264 encoder). The encoding component 412 may utilize the estimated bandwidth or bitrate or a bitrate determined based on an estimated bandwidth or bitrate 138 when encoding the packets 406. Indeed, in some implementations, a packet 406 may indicate the estimated bandwidth or bitrate 138 as a targeted bitrate for transmission of the packet 406. Additionally, or alternatively, the encoding component 412 may utilize a packetizer to generate the packets 406 based on the encoded image data 402 and/or audio data 404. In some examples, the packetizer may be configured to generate a packet 406, such as, for example, an RTP packet, having an RTP extension configured to indicate an absolute send time of a corresponding packet 406.

The pacer component 132 may perform various operations to smooth a sending bitrate of the electronic device 102. In some examples, the pacer component 132 may comprise a first queue 418 configured to store packets 406 (e.g., RTP packets) generated by the electronic device 102. That is, following generation of image data 402 and/or audio data 404 by an imaging device 118 and/or a microphone 120 of the electronic device 102, a packet 406 comprising the encoded image data and/or audio data may be generated and stored in the first queue 418 of the pacer component 132. The pacer component 132 may be configured to send packets 406 from the first queue 418 to a network socket buffer 134 that can be characterized as a second queue 420. The pacer component 132 may utilize the estimated bandwidth or bitrate 138 to determine a number of bytes that it can send. In some examples, the pacer component 132 may operate in a periodic mode utilizing time intervals (e.g., 5 ms) and sends new packets no more often than each time interval and may determine a number of bytes to send during a given time window based on the estimated bandwidth or bitrate 138. Additionally, or alternatively, the pacer component 132 may operate in a dynamic mode such that no minimum duration between packet send times is defined, and the pacer component 132 may send at a dynamic rate that may increase when time passes without sending a packet 406 and may decrease when a packet 406 is sent. In some examples, the first queue 418 and/or the second queue 420 may be configured as a first-in-first-out (FIFO) queue, such that first packets 406 that are added to the queue before second packets 406 will be removed from the queue before the second packets 406. Additionally, or alternatively, the first queue 418 may be configured to store a first number of packets 406 and the second queue 420 may configured to store a second number of packets 406, where the first number of packets 406 is greater than the second number of packets 406.

A network driver or other component or module may perform various operations to determine whether packets in the socket buffer 134 can be sent over a channel. As noted above, the network socket buffer 134 may be characterized as a second queue 420. The network socket buffer 134 may be configured to store packets 406 that are to be sent by the electronic device 102 over the network. For example, the network socket buffer 134 may receive a packet 406 from the pacer component 132 that was previously stored in the first queue 418. The second queue 420 may be configured to be substantially smaller in size than the first queue 418. A network driver may dequeue a packet 406 from the second queue 420 and transmit the packet 406 over Wi-Fi to a routing device 108, where the packet 406 may be routed to the cloud (e.g., one or more remote computing devices 104) by the routing device 102.

When a network stall occurs on the Wi-Fi network, the network driver may fail to send a packet 406 over the Wi-Fi network to the routing device 102. As such, the packet 406 may not be removed from the second queue 420, while additional packets 406 received from the pacer component 132 may continue to accumulate in the second queue 420.

In accordance with one or more preferred implementations, prior to attempting to pass a packet from the first queue to the socket buffer, the pacer component determines or queries whether the socket buffer is full. In accordance with one or more preferred implementations, when the pacer component tries to enqueue a packet at a full socket buffer, the socket buffer provides an indication of the full socket buffer.

In accordance with one or more preferred implementations, a determination by the system (e.g. based on or representing a determination by the pacer queue) that the network socket buffer is full can be characterized as suggesting the occurrence of a local network stall, e.g. a WiFi stall. At some point the second queue 420 may be at capacity (e.g., a threshold number of packets 406 are in the second queue 420). A pacer component or other component may determine that the socket buffer (e.g. the second queue 420 of the network socket buffer 134) being at capacity indicates the occurrence of a network stall associated with the Wi-Fi network. This indication may then be utilized by the adaptation component 136 to implement an adaptation algorithm 414.

As previously described, an adaptation component 136 may be configured to implement one or more adaptation algorithm(s) 414. For example, the adaptation component 136 may be configured to determine that a network stall has occurred on a local network associated with the electronic device 102 (e.g., a Wi-Fi network). In some examples, the adaptation component 136 may be configured to monitor network socket buffer 134 (e.g., the second queue 420) to determine when the second queue 420 is at capacity. Additionally, or alternatively, the adaptation component 136 may communicate with the pacer component 132 and/or a network driver to receive indications that a network stall has occurred.

The adaptation component 136 may implement the adaptation algorithm(s) 414 including process(es) to determine whether or not to adjust an estimated bandwidth or bitrate 138. For example, a process may include storing a first data packet 406 generated by the electronic device 102 in a first queue 418 of the pacer component 134. Additionally, or alternatively, the process may include determining if the network socket buffer 134 is full, according to the various techniques described herein. For example, the pacer component 132 may send a second data packet 406 to the network socket buffer 134 and may receive a response indicating that the second queue 420 is full. Additionally, or alternatively, the pacer component 132 may send a request to add the second data packet 406 from the first queue 418 to the network socket buffer 134, and the network driver or network socket buffer 134 may send a response indicating that the second queue 420 is full. Additionally, or alternatively, the controller component 130 may be configured to monitor the network socket buffer 134 and determine when the network socket buffer 134 is at capacity. If it is determined that the network socket buffer 134 is not full, the process may include removing the second packet 406 from the first queue 418 and adding the second packet 406 to the network socket buffer 134. Additionally, or alternatively, if it is determined that the network socket buffer 134 is full, the process may include determining that a network stall associated with the network has occurred.

The process may then continue when a feedback or control message is received from a remote computing device 104. As described hereinabove, the feedback or control message may indicate an absolute send time and/or an absolute receive time associated with a given packet. In some examples, utilizing receiver-side bandwidth estimation, the control message may indicate an adjusted estimated bandwidth or bitrate (e.g., adjusted estimated bandwidth or bitrate 316 as described with respect to FIG. 3) associated with a group of packets.

The process may then continue to determine if a network stall has been detected. In examples where a network stall has not been detected within a threshold period of time (e.g., a period of time from when the last packet 406 was sent from the electronic device 102), the process may include determining an adjusted estimated bandwidth or bitrate based on the control message. In some examples, the adjusted estimated bandwidth or bitrate may be determined by the electronic device 102 based on an absolute send time and/or an absolute receive time associated with a packet 406 and indicated by a control message. Additionally, or alternatively, the adjusted estimated bandwidth or bitrate may be determined by the remote computing device 104 and included in a control message returned to the electronic device 102. In some examples, the controller component 130 may be configured to determine the adjusted estimated bandwidth or bitrate and may store the adjusted estimated bandwidth or bitrate and utilize the adjusted estimated bandwidth or bitrate to encode and/or send packets over the original estimated bandwidth or bitrate 138. Additionally, or alternatively, in examples where a network stall has been detected, the process may include refraining from adjusting the estimated bandwidth or bitrate 138 for a period of time (e.g., 150 ms). In some examples, the adaptation component 136 may be configured to cause the controller component to refrain from determining the adjusted estimated bandwidth or bitrate and/or storing an adjusted estimated bandwidth or bitrate for the period of time. While the example period of time of 150 ms is provided above, and period of time greater than 0ms may be utilized as a period of time to refrain from adjusting the estimated bandwidth or bitrate 138.

In accordance with one or more preferred implementations, the electronic device 102 operates in a first state in which RTP packets 406 representing encoded video and/or audio are communicated from the electronic device 102 to a remote computing system 104, and transport-wide RTCP feedback messages are sent back to the electronic device 102 from the remote computing device 104 indicating packet identifiers and arrival times for sent RTP packets 406.

These transport-wide RTCP feedback messages are utilized to determine a latency-based bandwidth estimation. In accordance with one or more preferred implementations, an electronic device 102 operating in the first state updates a latency-based bandwidth estimation upon receiving a transport-wide RTCP feedback message (e.g. upon each received RTCP feedback message).

The remote computing system 104 also provides RTCP messages in the form of receiver reports.

These receiver reports are utilized to determine a loss-based bandwidth estimation. In accordance with one or more preferred implementations, an electronic device 102 updates a loss-based bandwidth estimation upon receiving a receiver report (e.g. upon each received receiver report).

In accordance with one or more preferred implementations, an overall bandwidth estimation is determined as the lesser of a loss-based bandwidth estimation and a latency-based bandwidth estimation. This bandwidth estimation may be evaluated for update every time a loss-based or delay-based bandwidth estimation is updated.

In accordance with one or more preferred implementations, the bandwidth estimation is utilized to determine a bitrate used for encoding video and/or sending RTP packets 406.

In accordance with one or more preferred implementations, based on determining that a network socket buffer 134 is full and/or remains full for a first threshold period of time, a first state flag is set indicating a second state. In the second state, the electronic device 102 continues to utilize the RTCP feedback messages to determine or adjust an estimated latency-based bandwidth estimation.

Subsequently, based on determining that the network socket buffer 134 is no longer full and based on the operating in the second state (e.g. based on the first state flag being set to indicate the second state), a timer is started and a second state flag (or the first state flag) is set indicating the third state.

While operating in the third state, the electronic device 102 continues to utilize RTCP feedback messages to determine or update a latency-based bandwidth estimation, but if this determined latency-based bandwidth estimation is lower than a previously determined latency-based bandwidth estimation (e.g. the most recent latency-based bandwidth estimation determined prior to entering the third state), then it is discarded and not used to update a stored current latency-based bandwidth estimation or a stored current overall bandwidth estimation.

On the other hand, while operating in the third state, if this determined latency-based bandwidth estimation is higher than a previously determined latency-based bandwidth estimation (e.g. the most recent latency-based bandwidth estimation determined prior to entering the third state), then it is used to update a stored current latency-based bandwidth estimation and (if lower than a stored current loss-based bandwidth estimation) a stored current overall bandwidth estimation.

Notably, while operating in the third state, received receiver reports are still used to determine or update a loss-based bandwidth estimation and (if lower than a stored current latency-based bandwidth estimation) a stored current overall bandwidth estimation.

Based on expiration of a time period (determined based on the timer), the electronic device returns to the first state.

As described herein, at least some of the processes of the remote computing device(s) 104 may be executed by the electronic device 102.

Figure 5:
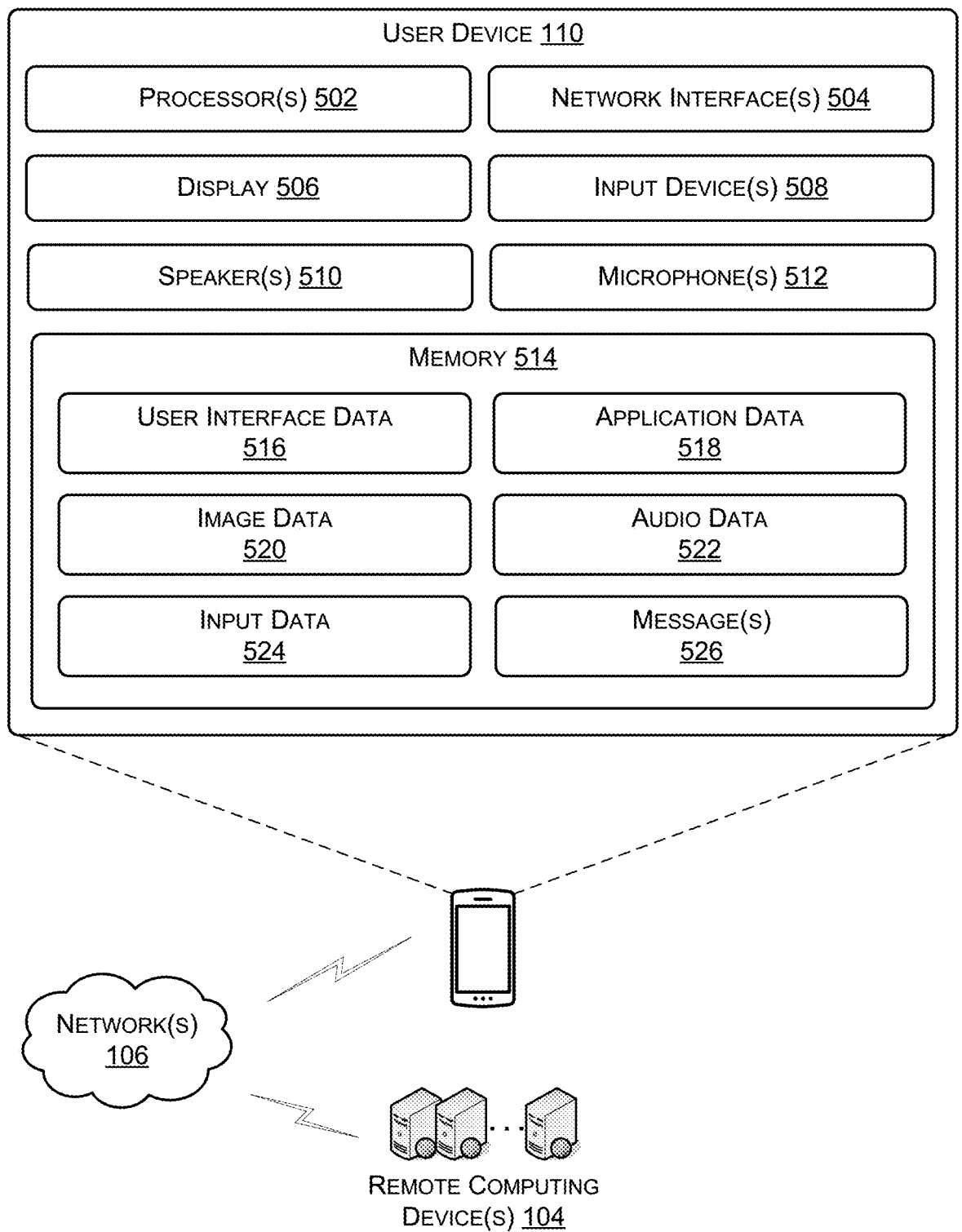
FIG. 5 illustrates a component diagram of an example user device for receiving, from one or more remote computing devices, image and/or audio data captured by an electronic device, according to the examples of the present disclosure.

Referring back to FIG. 1, the remote computing devices 104 may also send processed data representing the image data and/or audio data generated by the electronic device 102 to the user device 110, where the user device 110 may be configured to display the data, as described in more detail with respect to FIG. 5.

FIG. 5 illustrates a component diagram of an example user device 110 for receiving, from one or more remote computing devices 104, image and/or audio data captured by an electronic device 102, according to the examples of the present disclosure. As shown, the user device 104 may include processor(s) 502, network interface(s) 504, a display 506, input device(s) 508, speaker(s) 510, microphone(s) 512, and memory 514. As described herein, the speaker(s) 510 may be any electromechanical device capable of producing sound in response to an electrical signal input. The microphone(s) 512 may be an acoustic-to-electric transducer or sensor capable of converting sound waves into audio data representing the sound. The speaker(s) 510 and/or the microphone(s) 512 may be coupled to an audio CODEC to enable digital audio received by devices to be decompressed and output by the speaker(s) 510 and/or to enable audio data captured by the microphone(s) 512 to be compressed into digital audio data.

The input device(s) 508 may include, but are not limited to, buttons, switches, and/or any other device for inputting information. In some examples, the display 506 may include a touch-sensitive display. In such examples, the input device(s) 508 may include user interface data 516 including interface elements being displayed by the display 506.

As shown, the user device 104 may include application data 516 representing an application that provides the functionality described herein. For instance, the application may initially cause the display 506 to display a user interface represented by the user interface data 516, where the user interface provides a means for presenting audio data 522 and/or image data 520 received from the remote computing devices 104 and generated by the electronic device 102. Additionally, or alternatively, the user interface data 516 may provide a user interface configured to capture input data 524 received at the user interface. In some examples, the application data 516 may configure the processor(s) 502 to receive, using the network interface(s) 504, messages 526 (e.g., alerts, etc.) from one or more of the electronic device(s) 102 and/or the one or more remote computing device(s) 104.

In some of the present embodiments, in response to receiving a message 526, the application data 518 may configure the processor(s) 502 to cause the display 506 to display the message 526. The message 526 may indicate that the electronic device 102 detected motion, detected the presence of an object, received an input (e.g., to the input device(s) 124), etc. While displaying the message 526, the input device(s) 508 may receive input from the user 112 to answer the message 526. In response, the application data 506 may configure the processor(s) 502 to display the received image data 520 on the display 506 (e.g., display image(s) and/or video footage represented by the image data 520).

As described herein, at least some of the processes of the electronic device 102 and/or the remote computing device(s) 104 may be executed by the user device 110.

Figure 6A:
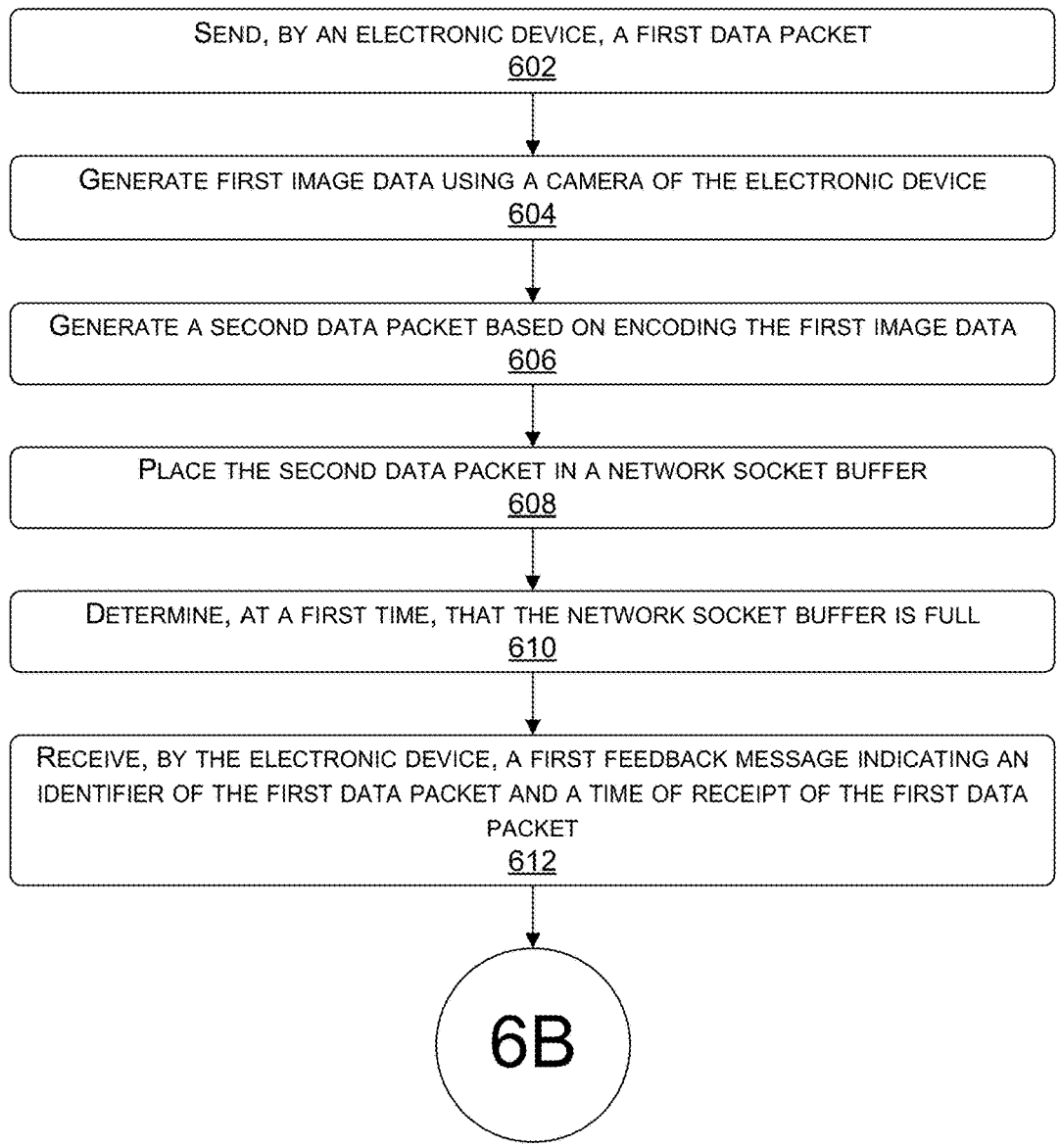
FIGS. 6A and 6B illustrate an example flow diagram of an example process for determining whether to update a current bandwidth estimation value based on an electronic device transitioning between states in response to determining a network socket buffer is full.
Figure 6B:
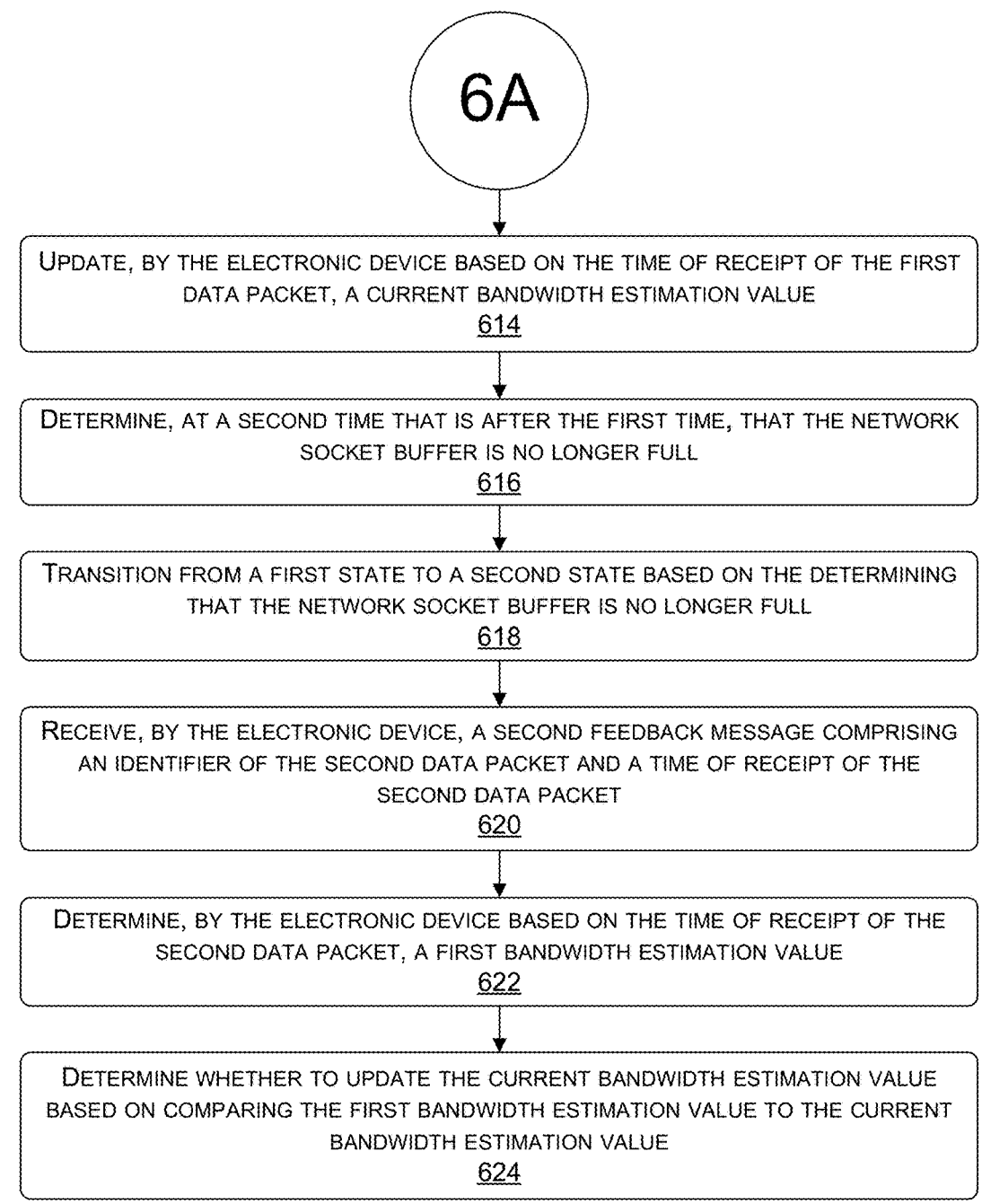
Figure 7:
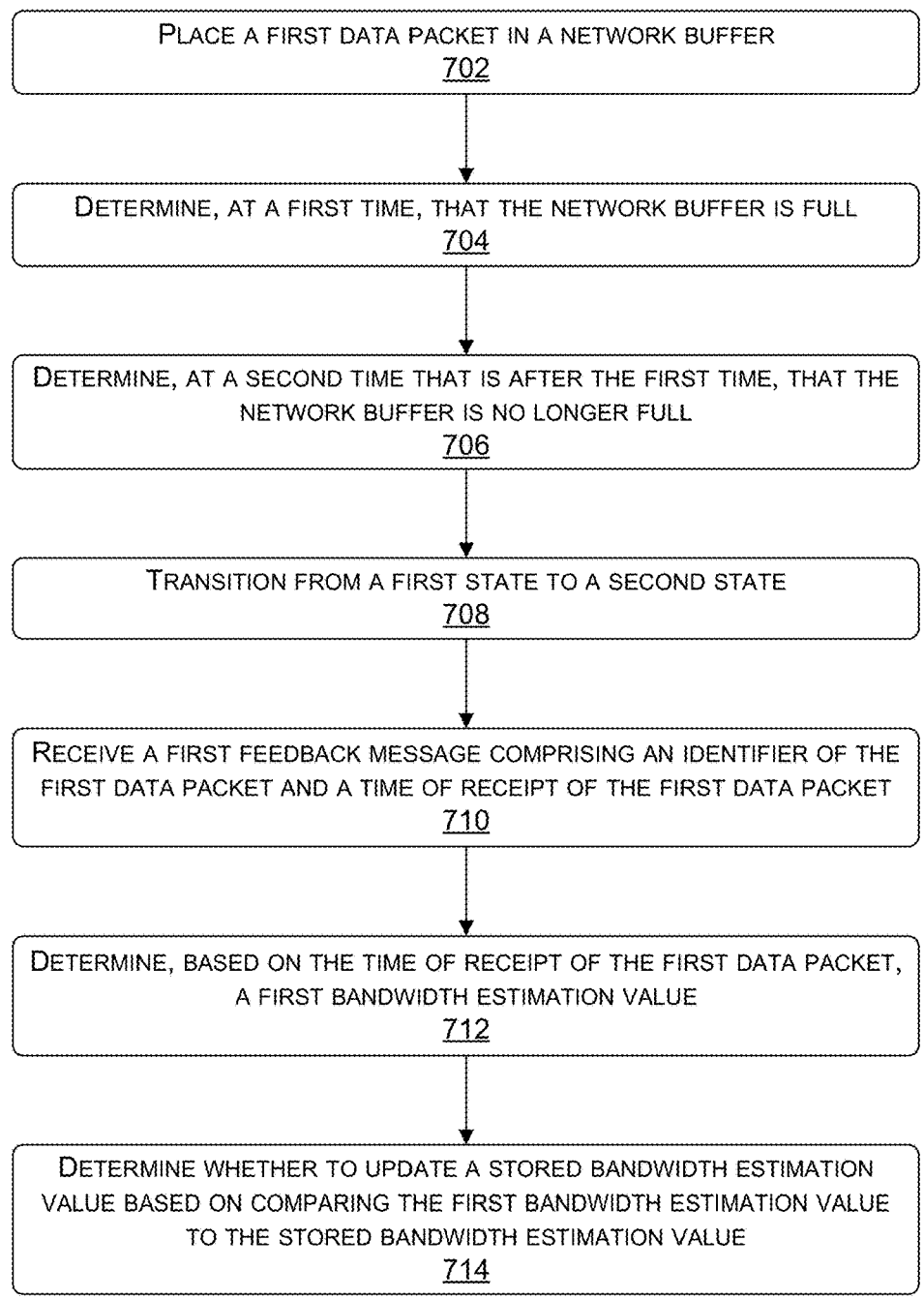
FIG. 7 illustrates an example flow diagram of an example process for using an electronic device to determine whether to update a stored bandwidth estimation value based on transitioning from a first state to a second state in response to determining that a network stall has occurred.

FIGS. 6 and 7 are flowcharts illustrating example processes 600 and 700 in accordance with examples of the present disclosure. The processes 600 and 700 described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process(es) 600-800, or alternative process(es), and not all of the blocks need be executed.

FIGS. 6A and 6B illustrate an example flow diagram of an example process 600 for determining whether to update a current bandwidth estimation value based on an electronic device transitioning between states in response to determining a network socket buffer is full. In some examples, the electronic device may correspond to the electronic device 102 as described with respect to FIGS. 1 and 4.

At 602, the process 600 may include sending, by an electronic device, a first data packet. In some examples, the first data packet may include an RTP extension indicating an absolute send time associated with the first data packet. At 604, the process 600 may include generating first image data using a camera of the electronic device. In some examples, the image data and the camera may correspond to the image data 402 and/or the imaging device(s) 118, as described with respect to FIG. 4. Additionally, or alternatively, the process 600 may include generating audio data using a microphone of the electronic device. At 606, the process 600 may include generating a second data packet based on encoding the first image data. In some examples, the encoding component 412, as described with respect to FIG. 4, may be configured to encode the first image data. For example, the first image data may be encoded with a target bitrate at which the electronic device is to send packets. Additionally, or alternatively, the second data packet may be generated by a packetizer, such as, for example, the packetizer 210 as described with respect to FIG. 2.

At 608, the process 600 may include placing the second data packet in a network socket buffer. In some examples, the network socket buffer may be configured as the network socket buffer 134 as described with respect to FIGS. 1 and 4. Additionally, or alternatively, the network socket buffer may be configured as a queue. At 610, the process 600 may include determining, at a first time, that the network socket buffer is full. In some examples, the electronic device may comprise a pacer component, such as, for example, the pacer component 132 as described with respect to FIG. 4, and the pacer component may determine that the network socket buffer is full. At 612, the process 600 may include receiving, by the electronic device, a first feedback message indicating an identifier of the first data packet and a time of receipt of the first data packet.

At 614, the process 600 may include updating, by the electronic device based on the time of receipt of the first data packet, a current bandwidth estimation value. At 616, the process 600 may include determining, at a second time that is after the first time, that the network socket buffer is no longer full. In some examples, the pacer component may determine that the network socket buffer is no longer full. At 618, the process 600 may include based on the determining that the network socket buffer is no longer full, transitioning from a first state to a second state.

At 620, the process 600 may include receiving, by the electronic device, a second feedback message comprising an identifier of the second data packet and a time of receipt of the second data packet. At 622, the process 600 may include determining, by the electronic device based on the time of receipt of the second data packet, a first bandwidth estimation value. The electronic devices may determine the first bandwidth estimation value using any of the techniques described above with respect to FIGS. 1-4. At 624, the process 600 may include determining whether to update the current bandwidth estimation value based on comparing the first bandwidth estimation value to the current bandwidth estimation value. In some examples, determining whether to update the current bandwidth estimation value may be in response to transitioning from the first state to the second state.

Additionally, or alternatively, the process 600 may updating, based on the determining of whether to update the current bandwidth estimation value, the current bandwidth estimation value to be the first bandwidth estimation value. Additionally, or alternatively, the process 600 may include generating second image data using the camera of the electronic device. Additionally, or alternatively, the process 600 may include encoding the second image data based on the current bandwidth estimation value.

Additionally, or alternatively, the process 600 may include updating, based on the determining of whether to update the current bandwidth estimation value, the current bandwidth estimation value to be the first bandwidth estimation value. Additionally, or alternatively, the process 600 may include sending a third data packet at a third time based on the current bandwidth estimation value.

FIG. 7 illustrates an example flow diagram of an example process 700 for using an electronic device to determine whether to update a stored bandwidth estimation value based on transitioning from a first state to a second state in response to determining that a network stall has occurred. In some examples, the electronic device may correspond to the electronic device 102 as described with respect to FIGS. 1 and 4.

At 702, the process 700 may include placing a first data packet in a network buffer. In some examples, the network buffer may be configured as a queue. At 704, the process 700 may include determining, at a first time, that the network buffer is full. In some examples, the electronic device may comprise a pacer component and the pacer component may be configured to determine that the network buffer is full. At 706, the process 700 may include determining, at a second time that is after the first time, that the network buffer is no longer full. In some examples, such a determination may be indicative of a network stall associated with a local network that the electronic device is connected to (e.g., a WiFi network). At 708, the process 700 may include transitioning from a first state to a second state. In some examples, transitioning from the first state to the second state may be based at least in part on determining that the network buffer is no longer full and/or that a network stall has occurred.

At 710, the process 700 may include receiving a first feedback message comprising an identifier of the first data packet and a time of receipt of the first data packet. In some examples, the first feedback message may be received from a remote computing device, such as, for example, the remote computing device 104 as described with respect to FIG. 1. At 712, the process 700 may include determining, based on the time of receipt of the first data packet, a first bandwidth estimation value. In some examples, the first bandwidth estimation value may be determined using any of the techniques described above with respect to FIGS. 1-4. At 714, the process 700 may include determining whether to update a stored bandwidth estimation value based on comparing the first bandwidth estimation value to the stored bandwidth estimation value. In some examples, determining whether to update a stored bandwidth estimation value may be based on transitioning from the first state to the second state.

Additionally, or alternatively, the process 700 includes updating, based on the determining of whether to update the stored bandwidth estimation value, the stored bandwidth estimation value to be the first bandwidth estimation value. Additionally, or alternatively, the process 700 includes generating second image data using the camera of the electronic device. Additionally, or alternatively, the process 700 includes encoding the second image data based on the stored bandwidth estimation value.

In some examples, the second image data may be encoded at a bitrate determined based on the first bandwidth estimation value.

Additionally, or alternatively, the process 700 includes determining that a first period of time has elapsed. Additionally, or alternatively, the process 700 includes transitioning from the second state to the first state based on the determining that the first period of time has elapsed.

Additionally, or alternatively, the process 700 includes determining that a first period of time has elapsed. Additionally, or alternatively, the process 700 includes transitioning from the second state to the first state based on the determining that the first period of time has elapsed. Additionally, or alternatively, the process 700 includes receiving a second feedback message comprising an identifier of a second data packet and a time of receipt of the second data packet. Additionally, or alternatively, the process 700 includes determining, based on the time of receipt of the second data packet, a second bandwidth estimation value. Additionally, or alternatively, the process 700 includes updating the stored bandwidth estimation value to the second bandwidth estimation value based on transitioning from the second state to the first state.

Additionally, or alternatively, the process 700 includes determining a loss-based bandwidth estimation value based on received data. Additionally, or alternatively, the process 700 includes comparing the first bandwidth estimation value to the loss-based bandwidth estimation value. Additionally, or alternatively, the process 700 includes updating the stored bandwidth estimation value to be the first bandwidth estimation value based on the determining of whether to update the stored bandwidth estimation value and based on the comparing of the first bandwidth estimation value to the loss-based bandwidth estimation value.

Additionally, or alternatively, the process 700 includes comparing the first bandwidth estimation value to a loss-based bandwidth estimation value. Additionally, or alternatively, the process 700 includes updating the stored bandwidth estimation value to be the first bandwidth estimation value based on the determining of whether to update the stored bandwidth estimation value and based on the comparing of the first bandwidth estimation value to the loss-based bandwidth estimation value.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A method comprising
sending, by an electronic device, a first data packet;
generating first image data using a camera of the electronic device;
generating a second data packet based on encoding the first image data;
placing the second data packet in a network socket buffer;
determining, at a first time, that the network socket buffer is full;
receiving, by the electronic device, a first feedback message indicating an identifier of the first data packet and a time of receipt of the first data packet;
updating, by the electronic device based on the time of receipt of the first data packet, a current bandwidth estimation value;
determining, at a second time that is after the first time, that the network socket buffer is no longer full;
based on the determining that the network socket buffer is no longer full, transitioning from a first state to a second state;
receiving, by the electronic device, a second feedback message comprising an identifier of the second data packet and a time of receipt of the second data packet;
determining, by the electronic device based on the time of receipt of the second data packet, a first bandwidth estimation value;
based on transitioning from the first state to the second state, determining whether a network stall has occurred based on comparing the first bandwidth estimation value to the current bandwidth estimation value; and
based on the transitioning from the first state to the second state, determining whether to update the current bandwidth estimation value based on determining whether the network stall has occurred.

2. The method of claim 1, further comprising:
updating, based on the determining of whether to update the current bandwidth estimation value, the current bandwidth estimation value to be the first bandwidth estimation value;
generating second image data using the camera of the electronic device; and
encoding the second image data based on the current bandwidth estimation value.

3. The method of claim 1, further comprising:
updating, based on the determining of whether to update the current bandwidth estimation value, the current bandwidth estimation value to be the first bandwidth estimation value; and
sending a third data packet at a third time based on the current bandwidth estimation value.

4. An electronic device comprising:
a camera;
a wireless transceiver;
one or more processors; and
one or more non-transitory computer-readable media storing instructions that, when executed by the one or more processors, cause the one or more processors to perform operations comprising:
placing a first data packet in a network buffer;
determining, at a first time, that the network buffer is full;
determining, at a second time that is after the first time, that the network buffer is no longer full;
based on the determining that the network buffer is no longer full, transitioning from a first state to a second state;
receiving a first feedback message comprising an identifier of the first data packet and a time of receipt of the first data packet;
determining, based on the time of receipt of the first data packet, a first bandwidth estimation value;
based on transition from the first state to the second state, determining whether a network stall has occurred based on comparing the first bandwidth estimation value to a stored bandwidth estimation value; and
based on the transitioning from the first state to the second state, determining whether to update the stored bandwidth estimation value based on determining whether the network stall has occurred.

5. The electronic device of claim 4, wherein the one or more non-transitory computer-readable media store instructions that, when executed by the one or more processors, cause the one or more processors to perform operations comprising:
updating, based on the determining of whether to update the stored bandwidth estimation value, the stored bandwidth estimation value to be the first bandwidth estimation value;
generating second image data using the camera of the electronic device; and
encoding the second image data based on the stored bandwidth estimation value.

6. The electronic device of claim 5, wherein the second image data is encoded at a bitrate determined based on the first bandwidth estimation value.

7. The electronic device of claim 4, wherein the one or more non-transitory computer-readable media store instructions that, when executed by the one or more processors, cause the one or more processors to perform operations comprising:
determining that a first period of time has elapsed; and
based on the determining that the first period of time has elapsed, transitioning from the second state to the first state.

8. The electronic device of claim 4, wherein the one or more non-transitory computer-readable media store instructions that, when executed by the one or more processors, cause the one or more processors to perform operations comprising:
determining that a first period of time has elapsed;
based on the determining that the first period of time has elapsed, transitioning from the second state to the first state;
receiving a second feedback message comprising an identifier of a second data packet and a time of receipt of the second data packet,
determining, based on the time of receipt of the second data packet, a second bandwidth estimation value, and
based on the transitioning from the second state to the first state, updating the stored bandwidth estimation value to the second bandwidth estimation value.

9. The electronic device of claim 4, wherein the one or more non-transitory computer-readable media store instructions that, when executed by the one or more processors, cause the one or more processors to perform operations comprising
determining a loss-based bandwidth estimation value based on received data;
comparing the first bandwidth estimation value to the loss-based bandwidth estimation value; and
updating the stored bandwidth estimation value to be the first bandwidth estimation value based on the determining of whether to update the stored bandwidth estimation value and based on the comparing of the first bandwidth estimation value to the loss-based bandwidth estimation value.

10. The electronic device of claim 4, wherein the one or more non-transitory computer-readable media store instructions that, when executed by the one or more processors, cause the one or more processors to perform operations comprising:
comparing the first bandwidth estimation value to a loss-based bandwidth estimation value; and
updating the stored bandwidth estimation value to be the first bandwidth estimation value based on the determining of whether to update the stored bandwidth estimation value and based on the comparing of the first bandwidth estimation value to the loss-based bandwidth estimation value.

11. A method comprising:
placing a first data packet in a network buffer of an electronic device;
determining, at a first time, that the network buffer is full;
determining, at a second time that is after the first time, that the network buffer is no longer full;
based on the determining that the network buffer is no longer full, transitioning from a first state to a second state, wherein transitioning from the first state to the second state causes the electronic device to determine whether a network stall has occurred prior to updating a stored bandwidth estimation value;
receiving a first feedback message comprising an identifier of the first data packet and a time of receipt of the first data packet;
determining, based on the time of receipt of the first data packet, a first bandwidth estimation value; and
based on the transitioning from the first state to the second state, determining whether to update the stored bandwidth estimation value based on comparing the first bandwidth estimation value to the stored bandwidth estimation value.

12. The method of claim 11, further comprising:
updating, based on the determining of whether to update the stored bandwidth estimation value, the stored bandwidth estimation value to be the first bandwidth estimation value;

generating second image data using a camera of the electronic device; and encoding the second image data based on the stored bandwidth estimation value.

13. The method of claim 12, wherein the second image data is encoded at a bitrate determined based on the first bandwidth estimation value.

14. The method of claim 11, further comprising:

determining that a first period of time has elapsed; and based on the determining that the first period of time has elapsed, transitioning from the second state to the first state.

15. The method of claim 11, further comprising:

determining that a first period of time has elapsed;

based on the determining that the first period of time has elapsed, transitioning from the second state to the first state;

receiving a second feedback message comprising an identifier of a second data packet and a time of receipt of the second data packet;

determining, based on the time of receipt of the second data packet, a second bandwidth estimation value, and based on the transitioning from the second state to the first state, updating the stored bandwidth estimation value to the second bandwidth estimation value.

16. The method of claim 11, further comprising:

determining a loss-based bandwidth estimation value based on received data;

comparing the first bandwidth estimation value to the loss-based bandwidth estimation value; and updating the stored bandwidth estimation value to be the first bandwidth estimation value based on the determining of whether to update the stored bandwidth estimation value and based on the comparing of the first bandwidth estimation value to the loss-based bandwidth estimation value.

17. The method of claim 11, further comprising:

comparing the first bandwidth estimation value to a loss-based bandwidth estimation value; and updating the stored bandwidth estimation value to be the first bandwidth estimation value based on the determining of whether to update the stored bandwidth estimation value and based on the comparing of the first bandwidth estimation value to the loss-based bandwidth estimation value.

18. The method of claim 11, further comprising, prior to placing the first data packet in the network buffer:

generating first image data using a camera of the electronic device; and generating the first data packet based on encoding the first image data.

19. The method of claim 11, further comprising:

updating, based on the determining of whether to update the stored bandwidth estimation value, the stored bandwidth estimation value to be the first bandwidth estimation value;

generating second image data using a camera of the electronic device;

encoding the second image data based on the stored bandwidth estimation value;

generating a second data packet based on the encoding of the second image data; and placing the second data packet in the network buffer of the electronic device.

20. The method of claim 12, wherein the second image data is encoded at a bitrate determined based on the first bandwidth estimation value.

* * * * *